United States Patent
Lacroix

(10) Patent No.: US 9,788,298 B1
(45) Date of Patent: Oct. 10, 2017

(54) SMART SURFACES FOR VISUO-HAPTICS NOTIFICATIONS

(71) Applicant: Immersion Corporation, San Jose, CA (US)

(72) Inventor: Robert Lacroix, San Jose, CA (US)

(73) Assignee: Immersion Corporation, San Jose, CA (US)

( * ) Notice: Subject to any disclaimer, the term of this patent is extended or adjusted under 35 U.S.C. 154(b) by 0 days.

(21) Appl. No.: 15/366,105

(22) Filed: Dec. 1, 2016

(51) Int. Cl.
  *H04B 1/40* (2015.01)
  *H04W 88/02* (2009.01)
  *H04W 68/00* (2009.01)
  *H04B 1/3888* (2015.01)

(52) U.S. Cl.
  CPC ........ *H04W 68/005* (2013.01); *H04B 1/3888* (2013.01)

(58) Field of Classification Search
  CPC ... H04W 64/00; H04W 64/005; H04W 64/06; H04W 64/08; H04W 64/008; H04B 1/3827; H04B 1/3833; H04B 1/3888; G06F 1/1694; G06F 3/016; G06F 3/041; G06F 3/0416; G06F 3/0488; G01R 31/3689
  See application file for complete search history.

(56) References Cited

U.S. PATENT DOCUMENTS

| | | | |
|---|---|---|---|
| 2009/0303175 A1* | 12/2009 | Koivunen | G06F 3/016 345/156 |
| 2012/0083312 A1* | 4/2012 | Kim | G06F 1/1694 455/556.1 |
| 2014/0320462 A1* | 10/2014 | Tseng | G06F 3/016 345/179 |
| 2015/0138104 A1* | 5/2015 | Sugita | G06F 3/016 345/173 |
| 2016/0062540 A1* | 3/2016 | Yang | G06F 3/016 345/173 |
| 2016/0364999 A1* | 12/2016 | Khadir | G06F 1/1694 |

* cited by examiner

*Primary Examiner* — Thanh Le
(74) *Attorney, Agent, or Firm* — Kilpatrick Townsend & Stockton LLP

(57) ABSTRACT

Examples of devices, systems, and methods to provide visuo-haptic notifications are disclosed. In one example, a visuo-haptic notification is provided by using a surface. A signal to cause an actuator to change a position of notification portion of the surface from an original position to a notification position is generated and output to the actuator to provide the visuo-haptic notification. In some examples, the notification portion of the surface has a display. The display may be visible when the notification portion of the surface is in the notification position and not visible when the notification portion of the surface is in the original position. At least part of the visuo-haptic notification can be provided on the display.

26 Claims, 18 Drawing Sheets

SMART SURFACES FOR VISUO-HAPTICS NOTIFICATIONS

FIELD

The present application generally relates to notifications and more generally relates to visuo-haptic notifications.

BACKGROUND

Traditionally, notifications have been provided to the display of a computing device. For example, notifications have traditionally been provided to the display of a smartphone. Such notifications, however, are typically provided for only a certain time and then disappear from the display. Further, such notifications may be missed by a user if, for example, the display is covered when a notification is provided. Visuo-haptic notifications that address these and other issues with traditional notifications are needed.

SUMMARY

Various examples are described for devices, systems, and methods to provide visuo-haptic notifications using smart surfaces.

One example disclosed method includes: determining, by a computing device, that a notification should be provided; determining, by the computing device, to use visuo-haptics to provide the notification; generating, by the computing device, a signal configured to cause a haptic output device to change a position of a notification portion of a surface from an original position to a notification position, wherein the change in position of the notification portion of the surface to the notification position provides at least part of the notification; and outputting, by the computing device, the signal to the haptic output device, wherein the notification portion of the surface maintains the notification position after the signal is output.

One example disclosed non-transitory computer-readable medium includes one or more software applications configured to be executed by a processor. In this example, the one or more software applications is configured to: determine that a notification should be provided; determine to use visuo-haptics to provide the notification; generate a signal configured to cause a haptic output device to change a position of a notification portion of a surface from an original position to a notification position, wherein the change in position of the notification portion of the surface to the notification position provides at least part of the notification; and output the signal to the haptic output device, wherein the notification portion of the surface maintains the notification position after the signal is output.

One example disclosed system includes an accessory for a portable computing device. In this example, the accessory comprises a surface comprising a notification portion and a haptic output device positioned on the notification portion of the surface and configured to cause a position of the notification portion of the surface to change between an original position and a notification position in response to receiving a notification signal from the portable computing device. In some examples, the haptic output device is configured to maintain the notification portion of the surface in the notification position after receiving the notification signal until receiving a repeat notification signal or an acknowledgment signal. In some examples, the haptic output device is further configured to cause the position of the notification portion of the surface to change from the notification position to the original position in response to receiving the acknowledgment signal. In some examples, the haptic output device is further configured to cause the position of the notification portion of the surface to change from the notification position to the original position and then revert back to the notification position in response to receiving the repeat notification signal, the repeat notification signal indicating that an acknowledgment by a user of the portable computing device has not been received.

In some examples, the accessory further comprises a bi-stable display disposed within the notification portion of the surface such that the bi-stable display is visible when the notification portion of the surface is in the notification position and is not visible when the notification portion of the surface is in the original position. The bi-stable display may be configured to display a notification message in response to receiving the notification signal from the portable computing device. In some examples, the accessory is a cover for the portable computing device. In some examples, the haptic output device comprises at least one multi-stable actuator.

In this example, the portable computing device comprises a display and a processor. In this example, the processor is in communication with the display and the haptic output device. In this example, the processor is configured to: determine that a notification should be provided; determine to use visuo-haptics to provide the notification; generate a signal configured to cause the haptic output device to cause the position of the notification portion of the surface to change from the original position to the notification position, wherein the change in position of the notification portion of the surface to the notification position provides at least part of the notification; and output the signal to the haptic output device, wherein the notification portion of the surface maintains the notification position after the signal is output.

These illustrative examples are mentioned not to limit or define the scope of this disclosure, but rather to provide examples to aid understanding thereof. Illustrative examples are discussed in the Detailed Description, which provides further description. Advantages offered by various examples may be further understood by examining this specification.

BRIEF DESCRIPTION OF THE DRAWINGS

The accompanying drawings, which are incorporated into and constitute a part of this specification, illustrate one or more certain examples and, together with the description of the example, serve to explain the principles and implementations of the certain examples.

DETAILED DESCRIPTION

Examples are described herein in the context of devices, systems, and methods to provide visuo-haptic notifications using smart surfaces. Those of ordinary skill in the art will realize that the following description is illustrative only and is not intended to be in any way limiting. Reference will now be made in detail to implementations of examples as illustrated in the accompanying drawings. The same reference indicators will be used throughout the drawings and the following description to refer to the same or like items.

In the interest of clarity, not all of the routine features of the examples described herein are shown and described. It will, of course, be appreciated that in the development of any such actual implementation, numerous implementation-specific decisions must be made in order to achieve the developer's specific goals, such as compliance with application- and business-related constraints, and that these specific goals will vary from one implementation to another and from one developer to another.

Illustrative Example of Providing a Visuo-Haptic Notification

Figure 1A:
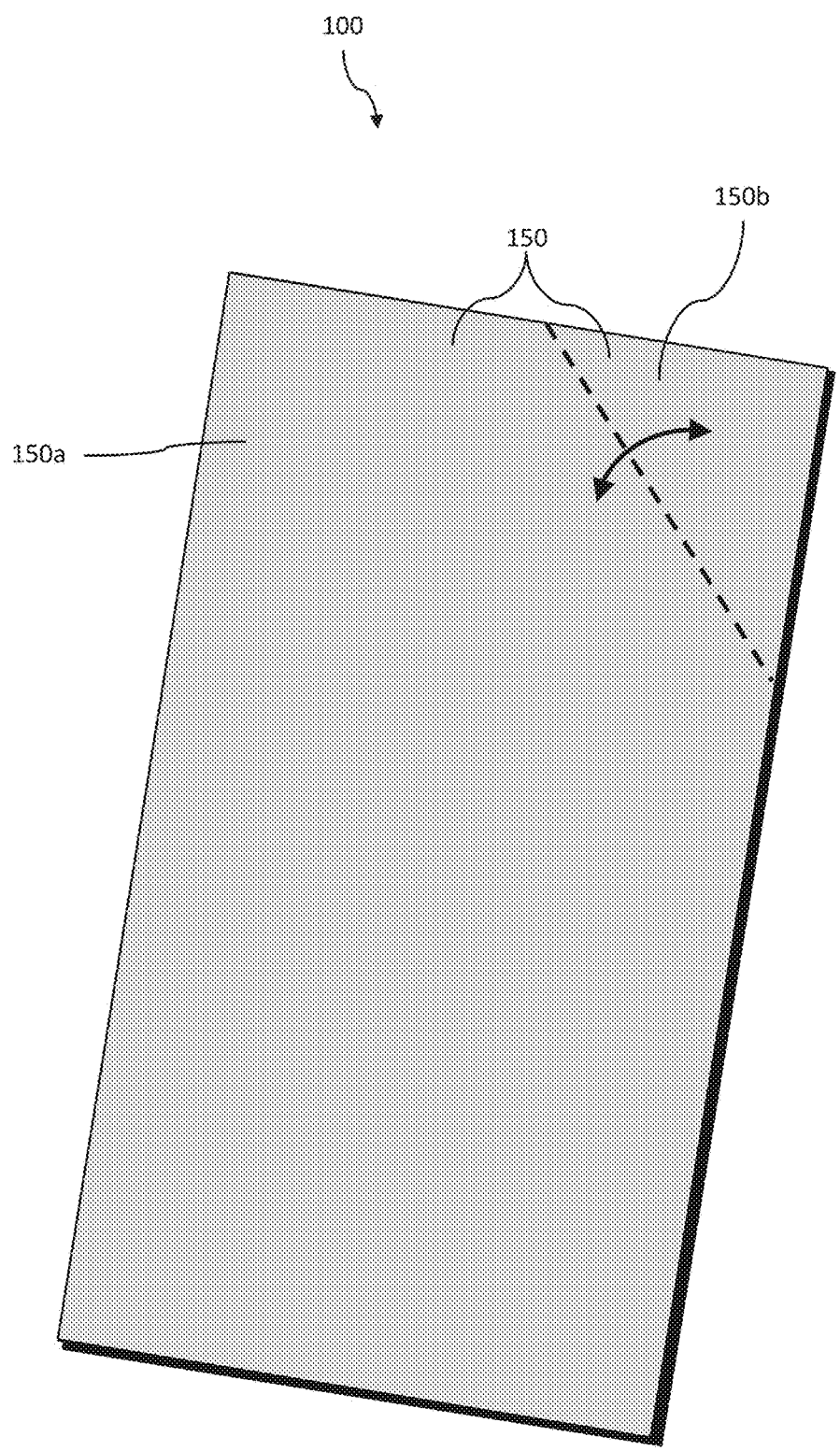
FIG. 1A shows an example computing device for providing visuo-haptic notifications with a surface in an original position.
Figure 1B:
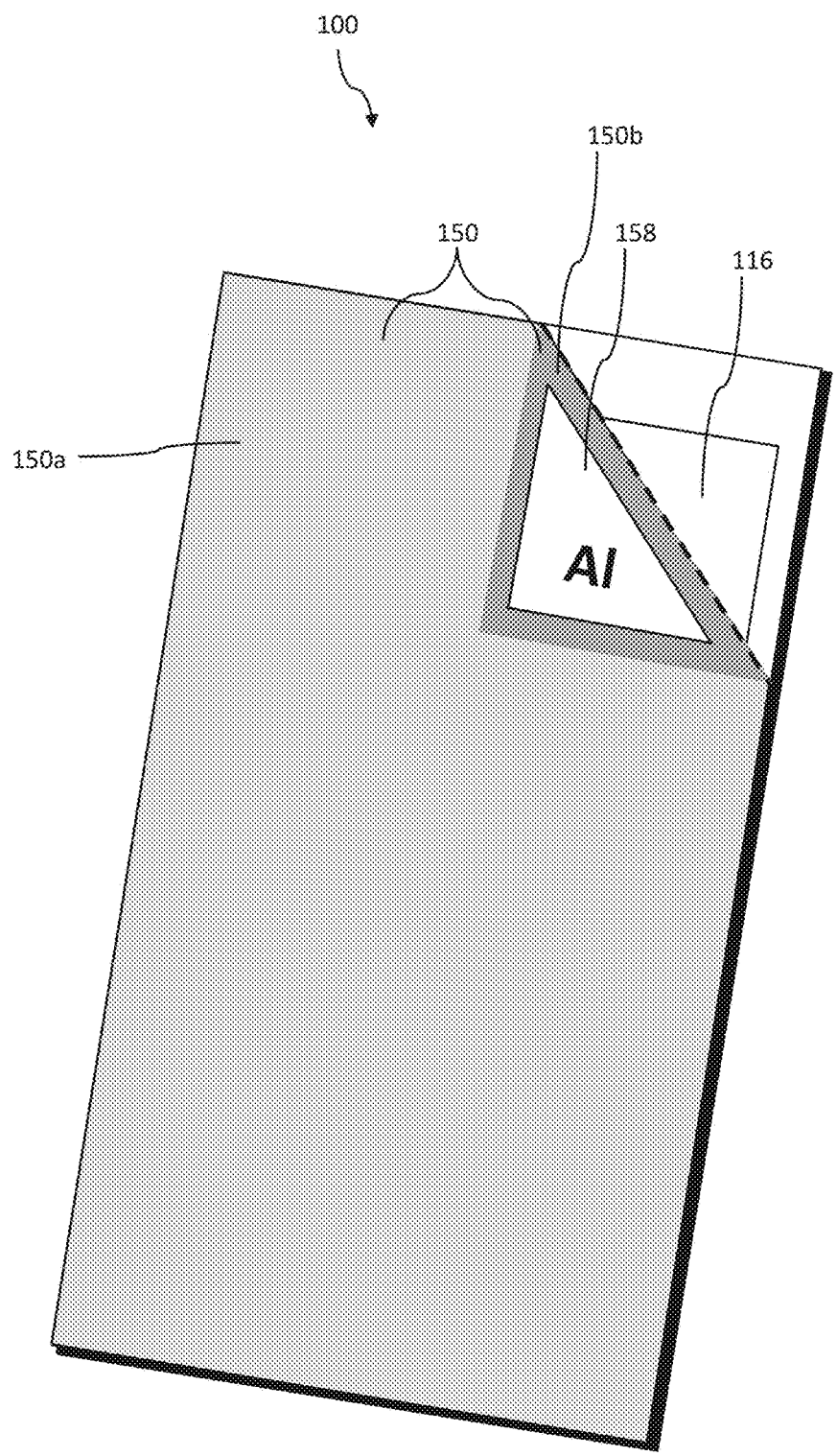
FIG. 1B shows an example computing device providing a visuo-haptic notification by having a notification portion of a surface in a notification position.

Referring now to FIGS. 1A and 1B, these figures show an example computing device 100 for providing visuo-haptic notifications according to an embodiment. In this example, the computing device 100 is a smartphone and has a touch-sensitive display 116 and a protective cover 150 (collectively, surface 150a and flexible surface 150b) for the touch-screen display 116. The top-right corner of the protective cover has a flexible surface 150b with bi-stable display 158, such as an electronic paper (E Ink) display, disposed therein such that the bi-stable display 158 faces the touch-screen display 116 when the cover is closed and a visuo-haptic notification is not being provided. The computing device 100 also has a bi-stable actuator (not shown) that is positioned and configured to change the flexible surface 150b from an original (e.g., non-notification) position (shown in FIG. 1A) to a notification position (shown in FIG. 1B) by applying a single burst of energy. As shown in FIG. 1A, in the original (e.g., non-notification) position, the protective cover 150 is flat or substantially flat. In addition, the protective cover 150 may cover bi-stable display 158 (not shown in FIG. 1A). As shown in FIG. 1B, in the notification position, the flexible surface 150b is parallel with surface 150a and is on top of surface 150a. In other examples, the flexible surface 150b may be perpendicular to or otherwise angled with respect to surface 150a. In FIG. 1B, the bi-stable display 158 faces outward in the same general direction as display 116. At least part of the notification can be provided on the bi-stable display 158 and/or display 116.

In one embodiment, when computing device 100 receives a text message from a sender, the computing device 100 determines that a notification should be provided. In this example, the computing device 100 also determines that a visuo-haptic notification should be provided because the display 116 is covered by the protective cover (collectively 150a and 150b) when the text message is received from the sender. Providing only a visual notification to display 116, in this example, would not be useful since the protective cover shown in FIG. 1A is preventing the display 116 from being seen by a user.

After the computing device 100 determines that a visuo-haptic notification should be provided, the computing device 100 generates a signal configured to cause the bi-stable actuator (not shown) to change a position of the flexible surface 150b from an original (e.g., non-notification) position (as shown in FIG. 1A) to a notification position (as shown in FIG. 1B). The signal is output to the bi-stable actuator. In this example, a single energy input changes the flexible surface 150b from the original (e.g., non-notification) position (as shown in FIG. 1A) to the notification position (as shown in FIG. 1B). In this example, the flexible surface 150b maintains the notification position without requiring any additional energy input. Accordingly, by using a bi-stable actuator (not shown) and a flexible surface 150b, a long-term visuo-haptic notification can be provided using a single energy input thereby reducing the energy requirements as compared to traditional notifications and extending the battery life of the computing device 100. In embodiments, the change of position from the original (e.g., non-notification) position to the notification position provides at least part of the notification.

In some examples, at least part of the notification includes displaying a name of the sender of the text message on bi-stable display 158. For example, as shown in FIG. 1B, if the first name of the sender of the text message is "A1" then "A1" is displayed on bi-stable display 158. In this example, a single energy input changes the bi-stable display 158 to display "A1" as shown in FIG. 1B. In this example, the bi-stable display 158 continues to display "A1" on the display after the single energy input has been applied without requiring any additional energy input. Accordingly, by using bi-stable display 158, a long-term visual notification can be provided using a single energy input thereby reducing the energy requirements compared to traditional displays and extending the battery life of the computing device 100.

In the example shown in FIGS. 1A and 1B, a user of computing device 100 can acknowledge that the notification has been accessed by the user by physically moving the flexible surface 150b from the notification position (as shown in FIG. 1B) to the original (e.g., non-notification) position (as shown in FIG. 1A). For example, as shown in FIG. 1B, in the notification position, the flexible surface 150b is parallel with surface 150a and is on top of surface 150a. In this example, the user can acknowledge that the notification has been accessed by the user physically moving the flexible surface 150b such that surface 150a and flexible surface 150b are flat or substantially flat (as shown in FIG. 1A), display 158 is no longer visible, and/or protective cover 150 completely covers display 116. In other examples, where the flexible surface 150b is perpendicular to or otherwise angled with respect to surface 150a when in the notification position, the user can acknowledge that the notification has been accessed by the user by the user physically moving the flexible surface 150b such that surface 150a is no longer perpendicular to or otherwise angled with respect to surface 150a.

If, however, the notification has not been acknowledged within a predetermined time then the notification may be repeated. For example, if a user of computing device 100 has not acknowledged that the notification has been accessed within five minutes, then the computing device 100 generates and outputs signals to the bi-stable actuator (not shown) to change the position of the flexible surface 150b from the notification position (as shown in FIG. 1B) to the original (e.g., non-notification) position (as shown in FIG. 1A) and back to the notification position (as shown in FIG. 1B). In some examples, the position of the flexible surface 150b changes from the notification position to the original (e.g., non-notification) position and back to the notification position a number of times (e.g., 3 times, 4 times, 5 times, etc.) to alert a user of the computing device 100 that the notification has not yet been acknowledged. The alert may be repeated periodically (e.g., every minute, every 5 minutes, every hour, etc.) until the notification is acknowledged by a user of computing device 100.

This illustrative example is given to introduce the reader to the general subject matter discussed herein and the disclosure is not limited to this example. The following sections describe various additional non-limiting examples and examples of systems and methods for automatically generating haptics based on color features and motion analysis.

Figure 2A:
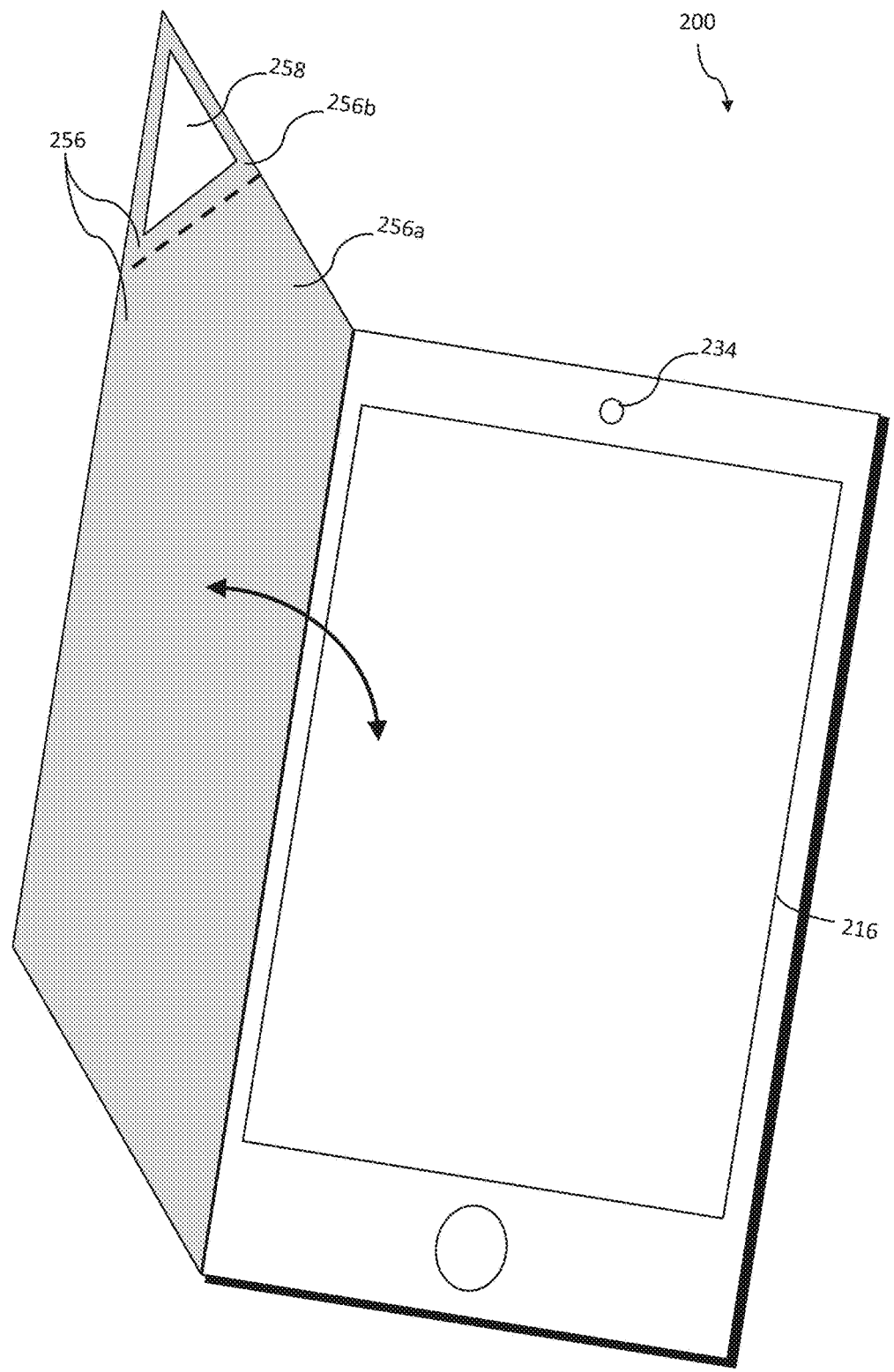
FIGS. 2A, 2B, and 2C show an example computing device for providing visuo-haptic notifications according to an embodiment.
Figure 2B:
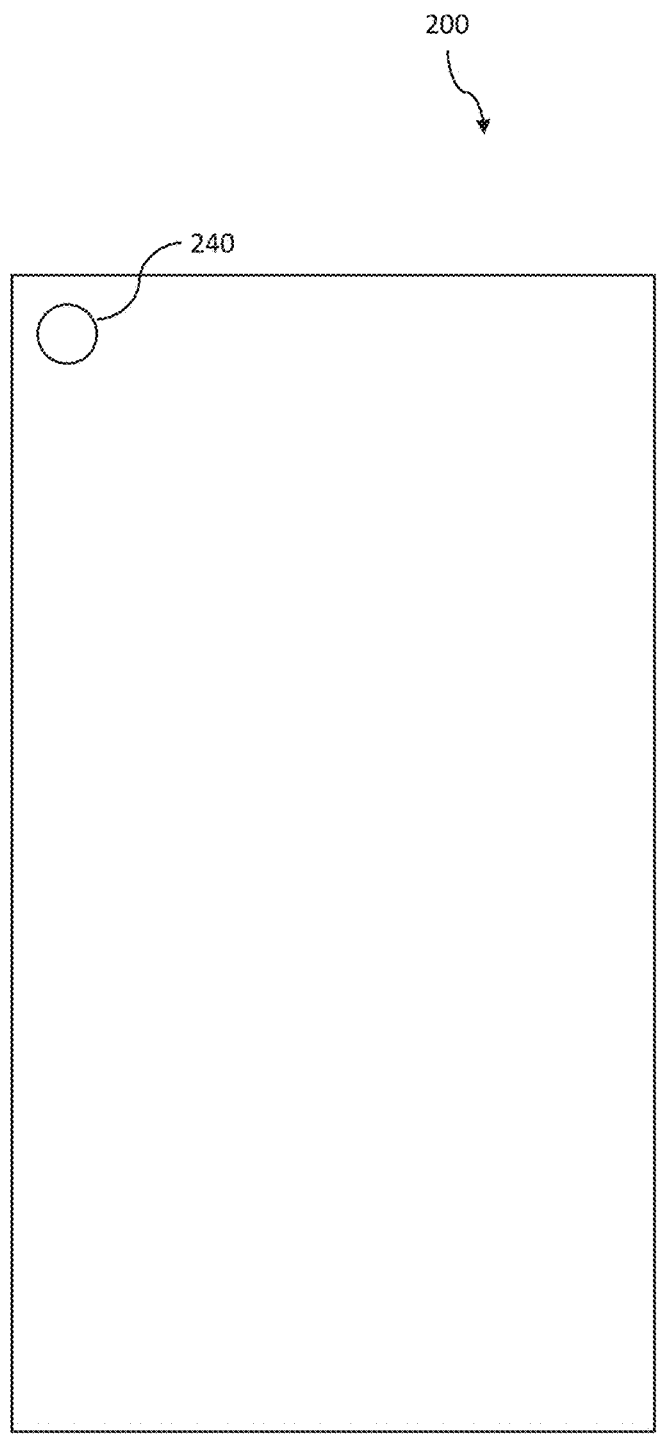
Figure 2C:
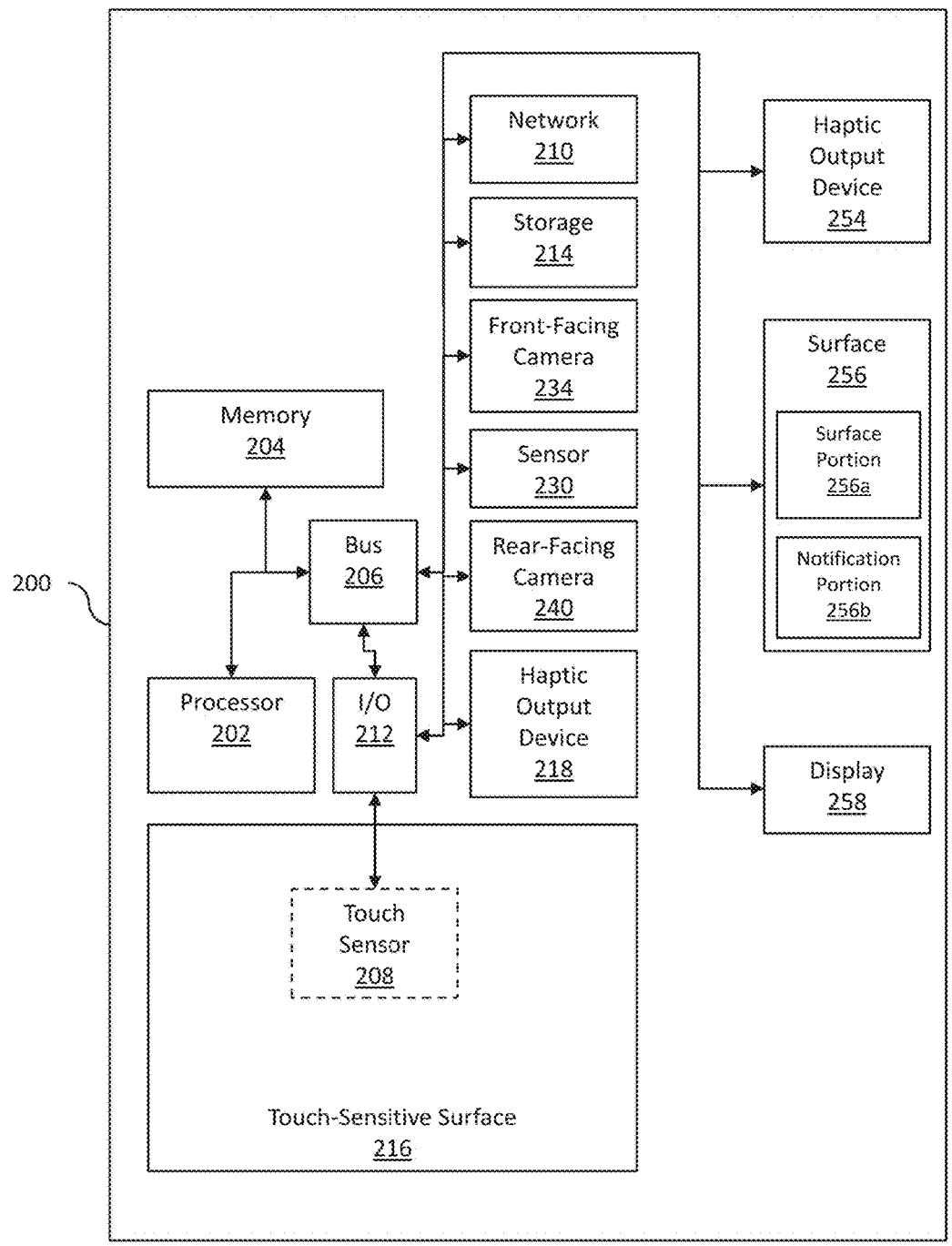

FIGS. 2A, 2B, and 2C show an example computing device for providing visuo-haptic notifications according to an embodiment. FIG. 2A shows the front of computing device 200, FIG. 2B shows the back of computing device 200, and FIG. 2C shows components of computing device 200.

Figure 3:
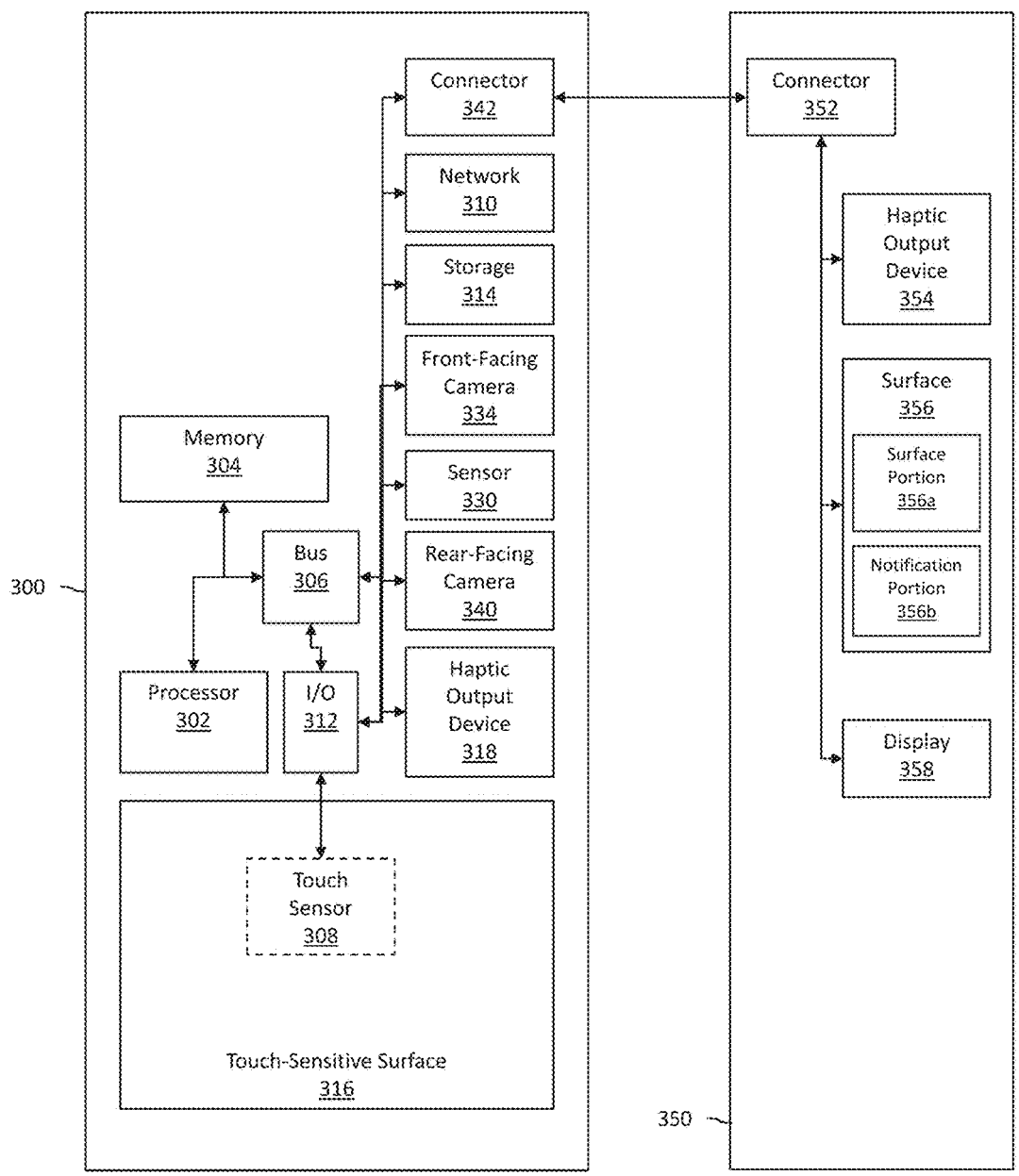
FIG. 3 shows an example system for providing visuo-haptic notifications according to an embodiment.

The computing device 200 may comprise, for example, a smartphone, phablet, tablet, e-reader, portable gaming device, or portable medical device. While computing device 200 is shown as a single device in FIGS. 2A-2C, in other examples, the computing device 200 may comprise multiple devices, for example, as shown in FIG. 3.

The example computing device 200 comprises a processor 202 interfaced with other hardware via bus 206. A memory 204, which can comprise any suitable tangible (and non-transitory) computer-readable medium such as RAM, ROM, EEPROM, or the like, may embody program components that configure operation of the computing device 200. For example, memory 204 can comprise one or more software applications that are configured to be executed by processor 202. The one or more software applications can be configured to cause computing device 200 provide visuo-haptic notifications. For example, the one or more software applications can be configured cause computing device 200 to perform method 400 described herein with respect to FIG. 4.

In some examples, the computing device 200 may further comprise one or more network interface devices 210, input/output (I/O) interface components 212, and additional storage 214.

Network interface device 210 can represent one or more of any components that facilitate a network connection. Examples include, but are not limited to, wired interfaces such as Ethernet, USB, IEEE 1394, and/or wireless interfaces such as IEEE 802.11, Bluetooth, or radio interfaces for accessing cellular telephone networks (e.g., transceiver/antenna for accessing a CDMA, GSM, UMTS, or other mobile communications network).

I/O components 212 may be used to facilitate a connection to devices such as one or more displays, keyboards, cameras, mice, speakers, microphones, buttons, joysticks, and/or other hardware used to input data or output data. Additional storage 214 represents nonvolatile storage such as read-only memory, flash memory, random access memory (RAM), ferroelectric RAM (F-RAM), magnetic, optical, or other storage media included in the computing device 200 or coupled to processor 202.

The computing device 200 includes a touch-sensitive surface 216. In the example shown in FIG. 2C, the touch-sensitive surface 216 is integrated into computing device 200. In other examples, the computing device 200 may not comprise the touch-sensitive surface 216. Touch-sensitive surface 216 represents any surface that is configured to sense tactile input of a user. In some examples, the touch-sensitive surface 216 may be rollable, bendable, foldable, stretchable, twistable, squeezable, or otherwise deformable. For example, the touch-sensitive surface 216 may comprise a bendable electronic paper or a touch-sensitive display device. In other examples, computing device 200 may have a display that is not touch-sensitive.

In some examples, one or more touch sensors 208 are configured to detect a touch in a touch area when an object contacts touch-sensitive surface 216 and, in response, the one or more touch sensors 208 provide appropriate data for use by processor 202. Any suitable number, type, or arrangement of sensors can be used. For example, resistive and/or capacitive sensors may be embedded in touch-sensitive surface 216 and used to determine the location of a touch and other information, such as pressure, speed, and/or direction. As another example, optical sensors with a view of the touch-sensitive surface 216 may be used to determine the touch position.

In other examples, the touch sensor 208 may comprise a LED (Light Emitting Diode) detector. For example, in some examples, touch-sensitive surface 216 may comprise a LED finger detector mounted on the side of a display. In some examples, the processor 202 is in communication with a single touch sensor 208. In other examples, the processor 202 is in communication with a plurality of touch sensors 208, for example, touch sensors associated with a first touch-screen and a second touch-screen. The touch sensor 208 is configured to detect user interaction, and based on the user interaction, transmit signals to processor 202. In some examples, touch sensor 208 may be configured to detect multiple aspects of the user interaction. For example, touch sensor 208 may detect the speed and pressure of a user interaction, and incorporate this information into the signal.

In some examples, computing device 200 may include a touch-enabled display that combines a touch-sensitive surface 216 and a display. The touch-sensitive surface 216 may correspond to the display exterior or one or more layers of material above components of the display. In other examples, touch-sensitive surface 216 may not comprise (or otherwise correspond to) a display, depending on the particular configuration of the computing device 200.

The computing device 200 also comprises one or more additional sensor(s) 230. The sensor(s) 230 are configured to transmit sensor signals to the processor 202. In some examples, the sensor(s) 230 may comprise, for example, a camera, humidity sensor, ambient light sensor, gyroscope, GPS unit, accelerometer, range sensor or depth sensor, biorhythm sensor, or temperature sensor. Although the example shown in FIG. 2C depicts the sensor 230 internal to computing device 200, in some examples, the sensor 230 may be external to computing device 200. For example, in some examples, the one or more sensors 230 may be associated with a game controller for use with a computing device 200 comprising a game system. In some examples, the processor 202 may be in communication with a single sensor 230 and, in other examples, the processor 202 may be in communication with a plurality of sensors 230, for example, a temperature sensor and a humidity sensor. In some examples, the sensor 230 may be remote from computing device 200, but communicatively coupled to processor 202, for example, as shown in FIG. 3.

Computing device 200 further includes haptic output device 218 in communication with the processor 202. The haptic output device 218 is configured to output a haptic effect in response to a haptic signal. In some examples, the haptic output device 218 is configured to output a haptic effect comprising, for example, a vibration, a change in a perceived coefficient of friction, a simulated texture, a change in temperature, a stroking sensation, an electro-tactile effect, or a surface deformation (e.g., a deformation of a surface associated with the computing device 200). Although a single haptic output device 218 is shown here, some examples may comprise multiple haptic output devices 218 of the same or different type that can be actuated in series or in concert to produce haptic effects.

In the example shown in FIG. 2C, the haptic output device 218 is internal to computing device 200. In other examples, the haptic output device 218 may be remote from computing device 200, but communicatively coupled to processor 202, for example, as shown in FIG. 3. For instance, haptic output device 218 may be external to and in communication with computing device 200 via wired interfaces such as Ethernet, USB, IEEE 1394, and/or wireless interfaces such as IEEE 802.11, Bluetooth, or radio interfaces.

In some examples, the haptic output device 218 may be configured to output a haptic effect comprising a vibration. In some such examples, the haptic output device 218 may comprise one or more of a piezoelectric actuator, an electric motor, an electro-magnetic actuator, a voice coil, a shape memory alloy, an electro-active polymer, a solenoid, an eccentric rotating mass motor (ERM), or a linear resonant actuator (LRA).

In some examples, the haptic output device 218 may be configured to output a haptic effect modulating the perceived coefficient of friction on along a surface of the computing device 200 in response to a haptic signal. In some such examples, the haptic output device 218 may comprise an ultrasonic actuator. The ultrasonic actuator may comprise a piezo-electric material. An ultrasonic actuator may vibrate at an ultrasonic frequency, for example 20 kHz, increasing or reducing the perceived coefficient at the surface of touch-sensitive surface 216.

In some examples, the haptic output device 218 may use electrostatic attraction, for example by use of an electrostatic actuator, to output a haptic effect. The haptic effect may comprise a simulated texture, a simulated vibration, a stroking sensation, or a perceived change in a coefficient of friction on a surface associated with computing device 200 (e.g., touch-sensitive surface 216). In some examples, the electrostatic actuator may comprise a conducting layer and an insulating layer. The conducting layer may be any semi-conductor or other conductive material, such as copper, aluminum, gold, or silver. The insulating layer may be glass, plastic, polymer, or any other insulating material. Furthermore, the processor 202 may operate the electrostatic actuator by applying an electric signal, for example an AC signal, to the conducting layer. In some examples, a high-voltage amplifier may generate the AC signal. The electric signal may generate a capacitive coupling between the conducting layer and an object (e.g., a user's finger or a stylus) near or touching the haptic output device 218. In some examples, varying the levels of attraction between the object and the conducting layer can vary the haptic effect perceived by a user.

The computing device 200 also includes a front-facing camera 234. For example, the front-facing camera 234 shown in FIG. 2A points or faces towards a user of the computing device 200 when the computing device 200 is used by the user. The front-facing camera 234 is configured to communicate a video signal to processor 202. In some examples, the processor 202 is in communication with front-facing camera 234 via bus 206.

The computing device 200 also includes a rear-facing camera 240. For example, the rear-facing camera 240 shown in FIG. 2B points or faces away from a user of the computing device 200 when the computing device 200 is used by the user. The rear-facing camera 240 is configured to communicate a video signal to processor 202. In some examples, the processor 202 is in communication with rear-facing camera 240 via bus 206.

Computing device 200 further includes haptic output device 254 in communication with the processor 202. The haptic output device 254 is positioned and configured to change a position of at least notification portion 256b of surface 256 (collectively, 256a and 256b) between at least an original position and a notification position in response to a signal. For example, haptic output device 254 can be positioned and configured to physically force at least notification portion 256b of surface 256 to change a position from an original position to a notification position (and vice versa). As another example, haptic output device 254 can be positioned and configured to deform at least notification portion 256b of surface 256 from an original position to a notification position (and vice versa). As another example, haptic output device 254 can be positioned and configured to cause at least notification portion 256b of surface 256 that has been changed from an original position to a notification position to revert back to the original position. In some examples, haptic output device 254 is one or more multi-stable actuators (e.g., bi-stable actuator(s), tri-stable actuator(s), etc.). In some examples, haptic output device 254 in computing device 200 is positioned and configured to cause a bendable notification portion of the entire computing device 200 to change from an original position to a notification position (and vice versa) to provide notifications. For example, a corner of the entire computing device 200 can be a notification portion and, in this example, the corner of the entire computing device 200 may bend from a flat original position to a raised notification position to provide a notification.

In some examples, the haptic output device 254 comprises one or more of a thin-film actuator, a piezoelectric actuator, an electric motor, an electro-magnetic actuator, a voice coil, a shape memory alloy, an electro-active polymer, a solenoid, an eccentric rotating mass motor (ERM), a linear resonant actuator (LRA), a smart gel, a shape memory actuator (SMA) actuator, or a DC motor. Although a single haptic output device 254 is shown in FIG. 2C, some examples may comprise multiple haptic output devices 254 of the same or different type that can be actuated in series or in concert to change at least notification portion 256b of surface 256 between at least an original position and a notification position.

In the example shown in FIG. 2C, the haptic output device 254 is internal to computing device 200. In other examples, the haptic output device 254 may be separate from computing device 200, but communicatively coupled to processor 202, for example, as shown in FIG. 3. For instance, haptic output device 254 may be external to and in communication with computing device 200 via wired interfaces such as Ethernet, USB, IEEE 1394, and/or wireless interfaces such as IEEE 802.11, Bluetooth, or radio interfaces.

Computing device 200 also includes surface 256 (collectively 256a and 256b). In examples, at least notification portion 256b of surface 256 is flexible such that haptic output device 254 can physically force the notification portion 256b of the surface to change between at least an original position and a notification position. In these examples, all of surface 256 or the notification portion 256b of surface 256 can comprise at least one of rubber, foam, flexible plastic, shape memory polymer, smart gel, shape memory alloy, and/or another suitable material. In some examples, at least notification portion 256b of surface 256 is hinged such that haptic output device 254 can physically force the notification portion 256b of the surface 256 to change between at least an original position and a notification position. In these examples, all of surface 256 or the notification portion 256b of surface 256 can comprise a flexible material (such as the examples provided above) and/or a rigid material (such as a rigid plastic, aluminum, thin steel, etc.).

In examples, surface 256 can be opened to make at least some of the components in computing device 200 accessible to and/or visible to a user of computing device 200 or closed to make at least some of the components in computing device 200 not be accessible to and/or visible to a user of computing device 200 when the notification portion 256b of the surface 256 is in the original position. For example, surface 256 completely covers touch-sensitive surface 216 when surface 256 is closed and 256b is in the original position (such as original position shown in FIG. 1A). In examples, when surface 256 is closed and the notification portion 256b of surface 256 is in the notification position (e.g., the notification position shown in FIG. 1B), at least part of touch-sensitive surface 216 is visible to a user of the computing device 200 (e.g., as shown in FIG. 1B).

Computing device 200 further includes display 258. In some examples, display 258 is a bi-stable display, such as an electronic paper (E Ink) display. In examples, display 258 can be a light-emitting diode display (LED), an electroluminescent display (ELD), plasma display panel (PDP), liquid crystal display (LCD), or organic light-emitting diode display (OLED). In some examples, display 258 is a thin flexible display. In examples, display 258 is disposed within the notification portion 256b of surface 256 that the haptic output device 254 changes positions between an original position and a notification position. In the example shown in FIG. 2A, display 258 faces towards touch-sensitive surface 216 (and away from a user of computing device 200) when surface 256 is closed and the notification portion 256b of surface 256 is in the original position. In other examples, display 258 faces away from touch-sensitive surface 216 (and towards a user of computing device 200) when surface 256 is closed and the notification portion 256b of surface 256 is in the original position.

Referring now to FIG. 3, this figure shows an example system for providing visuo-haptic notifications according to an embodiment. The system comprises a computing device 300 and an accessory 350 in communication with computing device 300 via connectors 342 and 352. In some embodiments, computing device 300 may comprise, for example, a smartphone, phablet, tablet, e-reader, portable gaming device, or medical device. In some embodiments, accessory 350 may comprise, for example, a cover for the entirety of computing device 300 or a cover for a portion of computing device 300 (such as a cover for touch-sensitive surface 316).

The computing device 300 comprises a processor 302 in communication with other hardware via bus 306 and memory 304. These components may be configured to function similarly to processor 202, bus 206, and memory 204 depicted in FIG. 2C, respectively. Memory 304 can comprise one or more software applications that are configured to be executed by processor 302. The one or more software applications can be configured to cause computing device 300 and accessory 350 to collectively provide visuo-haptic notifications. For example, the one or more software applications can be configured to cause computing device 300 and accessory 350 to perform method 400 described herein with respect to FIG. 4.

The computing device 300 also comprises touch sensor 308, network interface device 310, I/O components 312, storage 314, front-facing camera 334, touch-sensitive surface 316, sensors 330, rear-facing camera 340, and haptic output device 318. These components may be configured to function similarly to the touch sensor 208, network interface device 210, I/O components 212, storage 214, front-facing camera 234, touch-sensitive surface 216, sensors 230, rear-facing camera 240, and haptic output device 218 depicted in FIG. 2C, respectively.

The computing device 342 further comprises a connector 342 that physically mates with and/or wirelessly communicates with connector 352 in the accessory 350. For example, connectors 342 and 352 may physically mate via Ethernet, USB, IEEE 1394, pins and sockets, tabs and slots, etc. As another example, connectors 342 and 352 may wireless communicate using IEEE 802.11, Bluetooth, or radio interfaces.

The accessory 350 comprises connector 352, haptic output device 354, and surface 356. In some embodiments, accessory 350 also comprises display 358. Haptic output device 354, surface 356, and display 358 may be configured to function similarly to the haptic output device 254, surface 256, and display 258.

Figure 4:
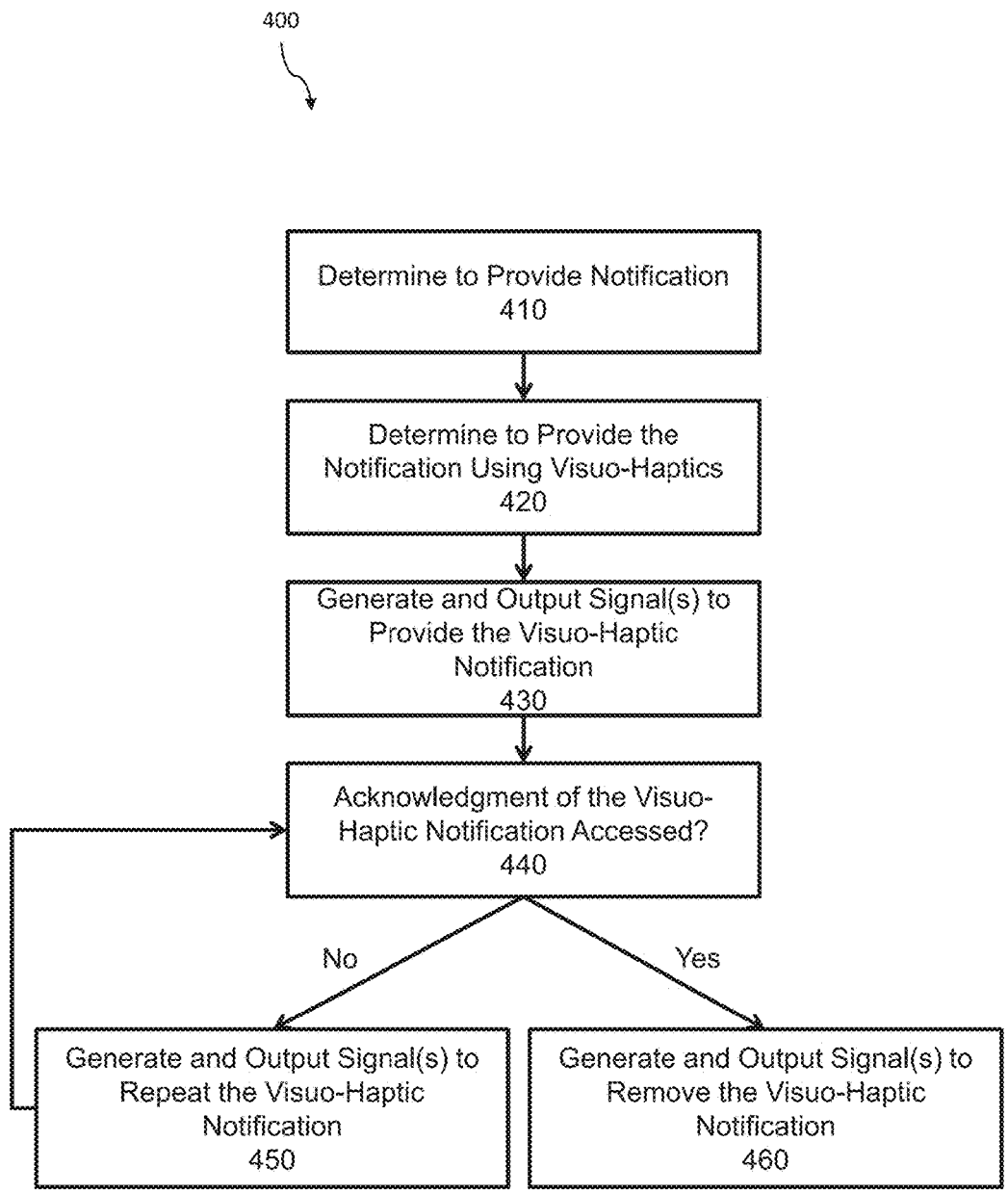
FIG. 4 shows an example method of providing a visuo-haptic notification according to an embodiment.

Referring now to FIG. 4, FIG. 4 illustrates an example method 400 of providing a visuo-haptic notification according to an embodiment. Reference will be made with respect to FIGS. 1A-1B, 2A-2C, 3, 5-15; however, any suitable device(s) according to this disclosure may be employed to provide visuo-haptic notifications according to various embodiments.

The method 400 begins at block 410 when a determination to provide a notification is made. For example, in one embodiment, processor 202 in computing device 200 determines that a notification should be provided when a message is received via network interface 210 from a user of another computing device. The message can be a text message (e.g., short message service (SMS) message, Apple® iMessage®, etc.), an email, a tweet, a chat, a meeting request, or another suitable message. In some embodiments, processor 302 in computing device 300 determines that a notification should be provided based at least in part on receiving an indication from an application being executed on computing device 300. For example, a calendar application can indicate that a notification should be provided fifteen minutes before an upcoming appointment is to begin. As another example, a social application can indicate that a notification should be provided when a new image is received. As yet another example, a determination can be made to provide a notification in response to a timer ending in a clock application. In various examples, a determination can be made to provide a notification based on information received from another computing device or an indication (such as a request) from an application executing on the computing device.

At block 420, a determination is made to provide the notification using visuo-haptics. In one embodiment, processor 202 in computing device 200 determines that the notification should be provided using visuo-haptics when surface 256 covers touch-sensitive surface 216 which, in this example, is a touch-sensitive display. In embodiments, processor 302 in computing device 300 determines that the notification should be provided using visuo-haptics when the computing device 300 is in a particular orientation. For example, computing device 300 can have a gyroscopic sensor and/or a pressure sensor that is used to determine whether the notification portion 356*b* of surface 356 that changes between an original position and a notification position is lying against an object that is not part of the computing device 300. For example, a gyroscopic sensor and/or a pressure sensor can be used to determine whether the notification portion 356*b* of the surface 356 that changes between an original position and a notification position is lying on a table. In this example, if the notification portion 356*b* of the surface 356 is not lying against an object (e.g., a table) or is otherwise facing upwards, a determination is made to provide the notification using visuo-haptics.

In some embodiments, processor 202 in computing device 200 determines that the notification should be provided using visuo-haptics based on an importance of the notification. For example, if the notification is a high priority notification, then processor 202 in computing device 200 can determine that the notification should be provided using visuo-haptics. In some embodiments, processor 202 in computing device 200 determines that the notification should be provided based on a preference specified by a user of the computing device 200. For example, a user of computing device 200 can specify that upcoming appointment notification should be provided using visuo-haptics. As another example, a user of computing device 200 can specify that a notification corresponding to a message received from the user's spouse should be provided using visuo-haptics and that messages received from others should not be provided using visuo-haptics. As yet another example, a user of computing device 200 can specify that a notification corresponding to a message received from a contact in the user's contact list should be provided using visuo-haptics and that messages received from other not in the user's contact list should not be provided using visuo-haptics.

In examples, a determination can be made to provide a notification using visuo-haptics based on information received from another computing device requesting that the notification be provided using visuo-haptics or an indication (such as a request) from an application executing on the computing device to provide the notification using visuo-haptics.

At block 430, at least one signal is generated and output to provide the visuo-haptic notification. In one embodiment, processor 202 in computing device 200 generates a signal configured to cause haptic output device 254 to force at least notification portion 256*b* of surface 256 to change from an original position to a notification position and outputs the generated signal to haptic output device 254. The generated signal, for example, can cause an actuator to force the flexible surface 150*b* of cover 150 to change from an original position (such as shown in FIG. 1A) to a notification position (such as shown in FIG. 1B). In this example, the flexible surface 150*b* of cover 150 changing from the original position to the notification position itself provides at least part of the notification. Furthermore, in at least examples where the haptic output device 254 is one or more multi-stable actuators, the flexible surface 150*b* of the cover 150 maintains the notification position after the signal is output. In at least these examples, once the signal has been output and the one or more multi-stable actuators has been output to force the flexible surface 150*b* of the cover 150 to change from an original position to a notification position, the flexible surface 150*b* of cover 150 maintains the notification position without requiring additional energy input.

In some embodiments, processor 202 in computing device 200 generates a signal configured to cause display 258 disposed within surface 256 to display text and/or graphic(s) to provide at least part of the notification and outputs the signal to display 258. In these examples, the text and/or graphic(s) is displayed on display 258. In examples, the display 258 is disposed within a notification portion 256*b* of the surface 256 that changes position from the original position to the notification position. For example, as shown in FIG. 1B, the display 158 is disposed within flexible surface 150*b* of cover 150. In some examples, the display 258 is disposed within a notification portion 256*b* of the surface 256 such that the display 258 is visible when the notification portion 256*b* of the surface 256 is in the notification position and is not visible when the notification portion 256*b* of the surface 256 is in the original position. For example, as shown in FIG. 1A, display 158 is not visible when the flexible surface 150*b* of the cover 150 is in the original position but display 158 is visible, as shown in FIG. 1B, when the flexible surface 150*b* of the cover 150 is in the notification position.

As other examples, a display (not shown) in notification portion (e.g., 550*b*, 650*b*, 750*b*, 750*c*, 850*b* in FIGS. 5-8, respectively) of a surface (e.g., 550, 650, 750, 850 in FIGS. 5-8, respectively) is not visible when the notification portion (e.g., 550*b*, 650*b*, 750*b*, 750*c*, 850*b* in FIGS. 5-8, respectively) of the surface (e.g., 550, 650, 750, 850 in FIGS. 5-8, respectively) is in the original position. In examples, display (e.g., 1158, 1258, 1558 in FIGS. 11, 12, and 15, respectively) is disposed within a notification portion (e.g., 1150*b*, 1250*b*, 1550*b* in FIGS. 11, 12, and 15, respectively) of a surface (e.g., 1150, 1250, 1550 in FIGS. 11, 12, and 15, respective) and the display (e.g., 1158, 1258, 1558 in FIGS. 11, 12, and 15, respectively) is visible when the notification portion (e.g., 1150*b*, 1250*b*, 1550*b* in FIGS. 11, 12, and 15, respectively) of the surface (e.g., 1150, 1250, 1550 in FIGS. 11, 12, and 15, respective) is in the notification position. As discussed above, and as further shown in FIGS. 11, 12, and 15, at least part of the notification can be displayed on a display (e.g., 1158, 1258, 1558 in FIGS. 11, 12, and 15, respectively) disposed within a notification portion (e.g., 1150*b*, 1250*b*, 1550*b* in FIGS. 11, 12, and 15, respectively) of a surface (e.g., 1150, 1250, 1550 in FIGS. 11, 12, and 15, respective) that changes from an original position to a notification position when the notification portion (e.g., 1150*b*, 1250*b*, 1550*b* in FIGS. 11, 12, and 15, respectively) of the surface (e.g., 1150, 1250, 1550 in FIGS. 11, 12, and 15, respective) is in the notification position.

Figure 10:
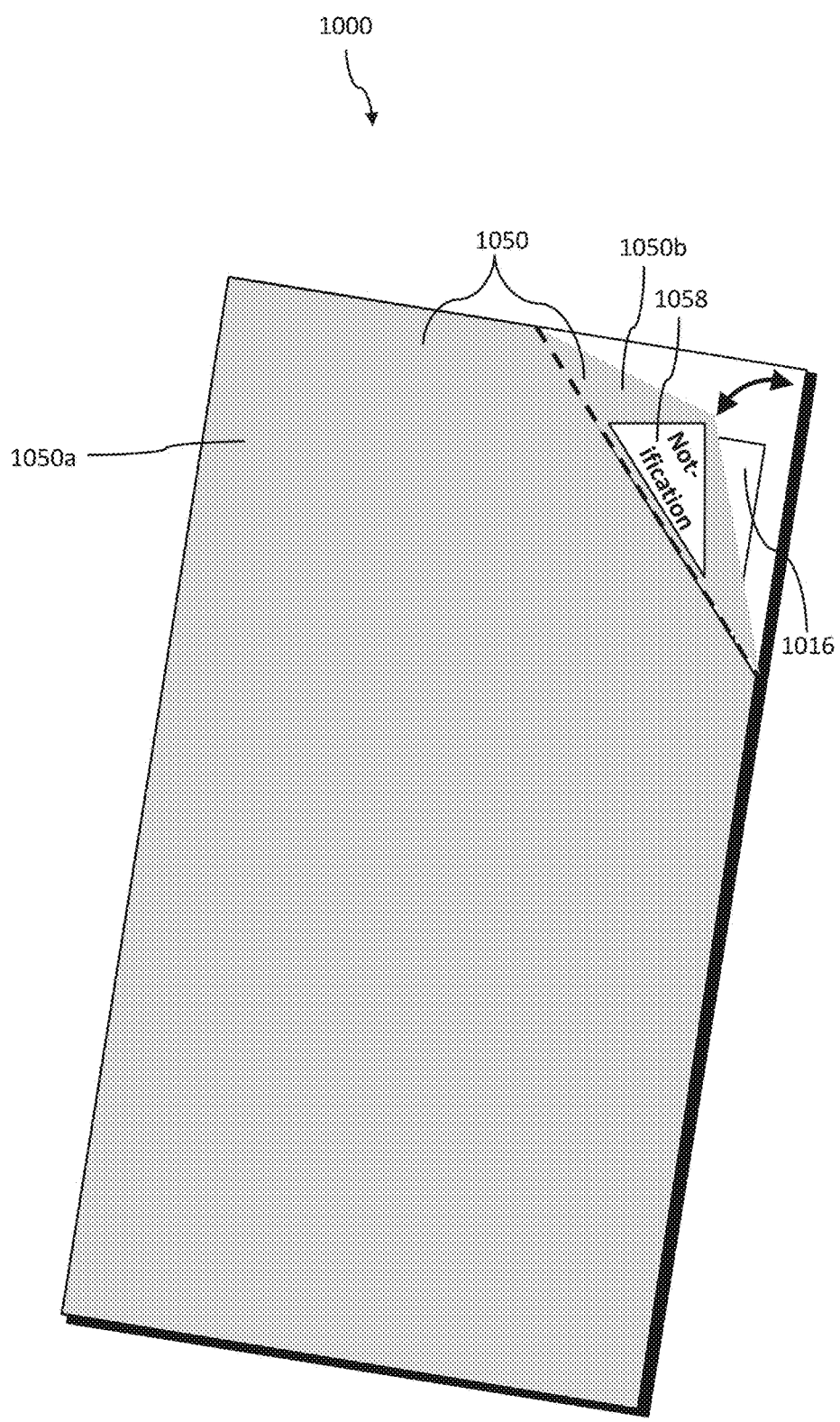
FIG. 10 shows an example computing device providing a visuo-haptic notification by having a notification portion of a surface in a notification position.
Figure 11:
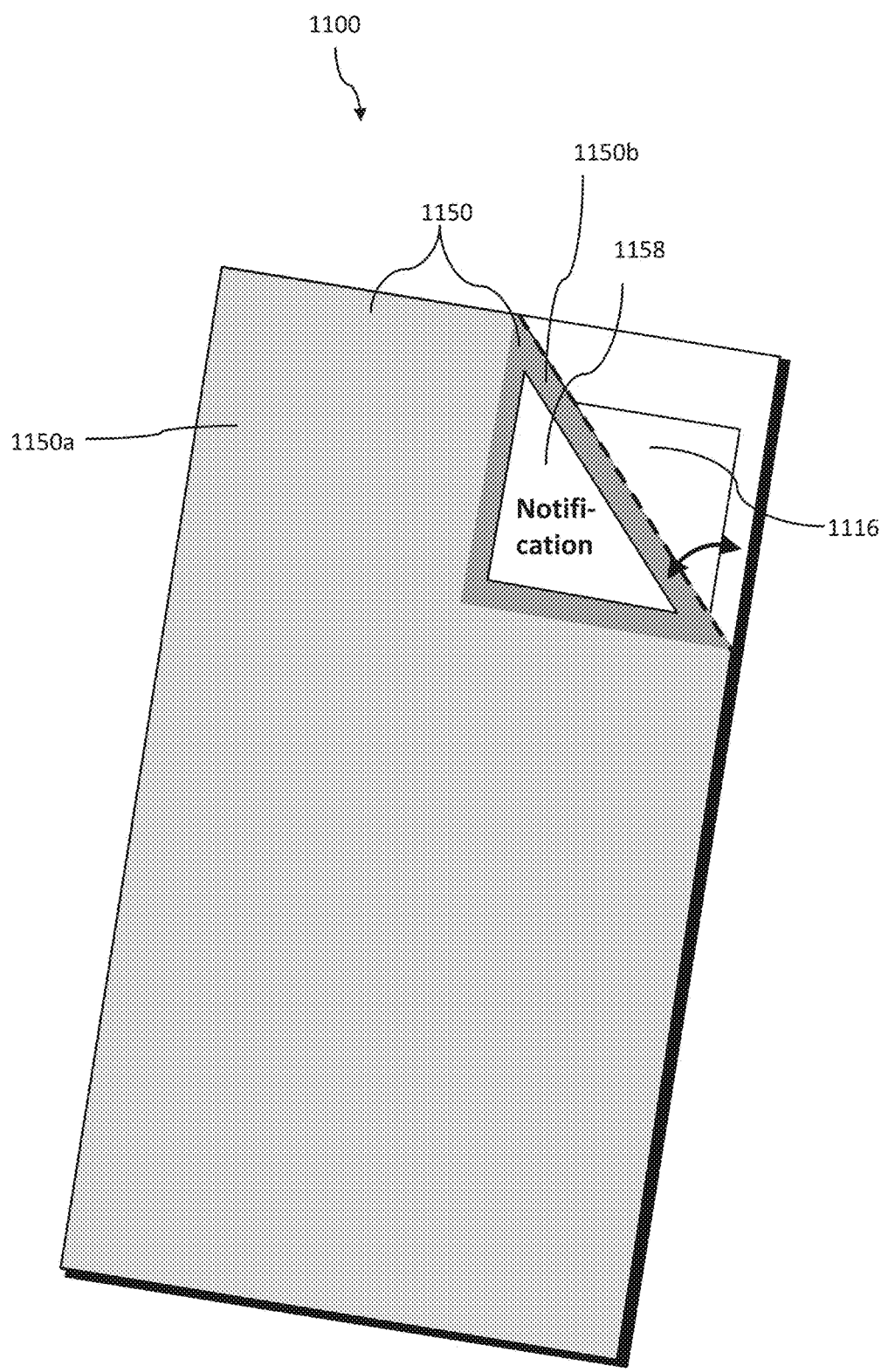
FIG. 11 shows an example computing device providing a visuo-haptic notification by having a notification portion of a surface in a notification position.
Figure 12:
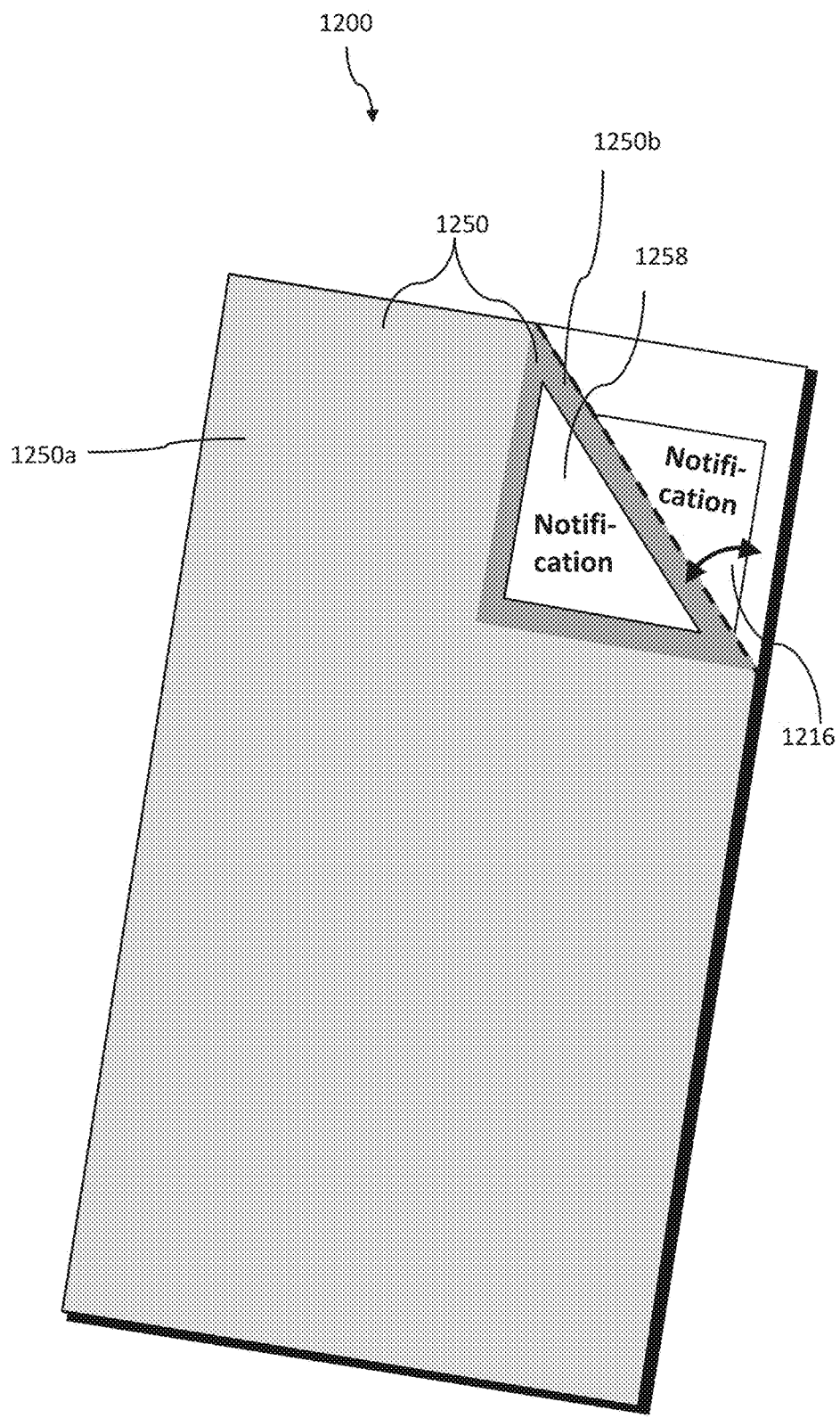
FIG. 12 shows an example computing device providing a visuo-haptic notification by having a notification portion of a surface in a notification position.
Figure 13:
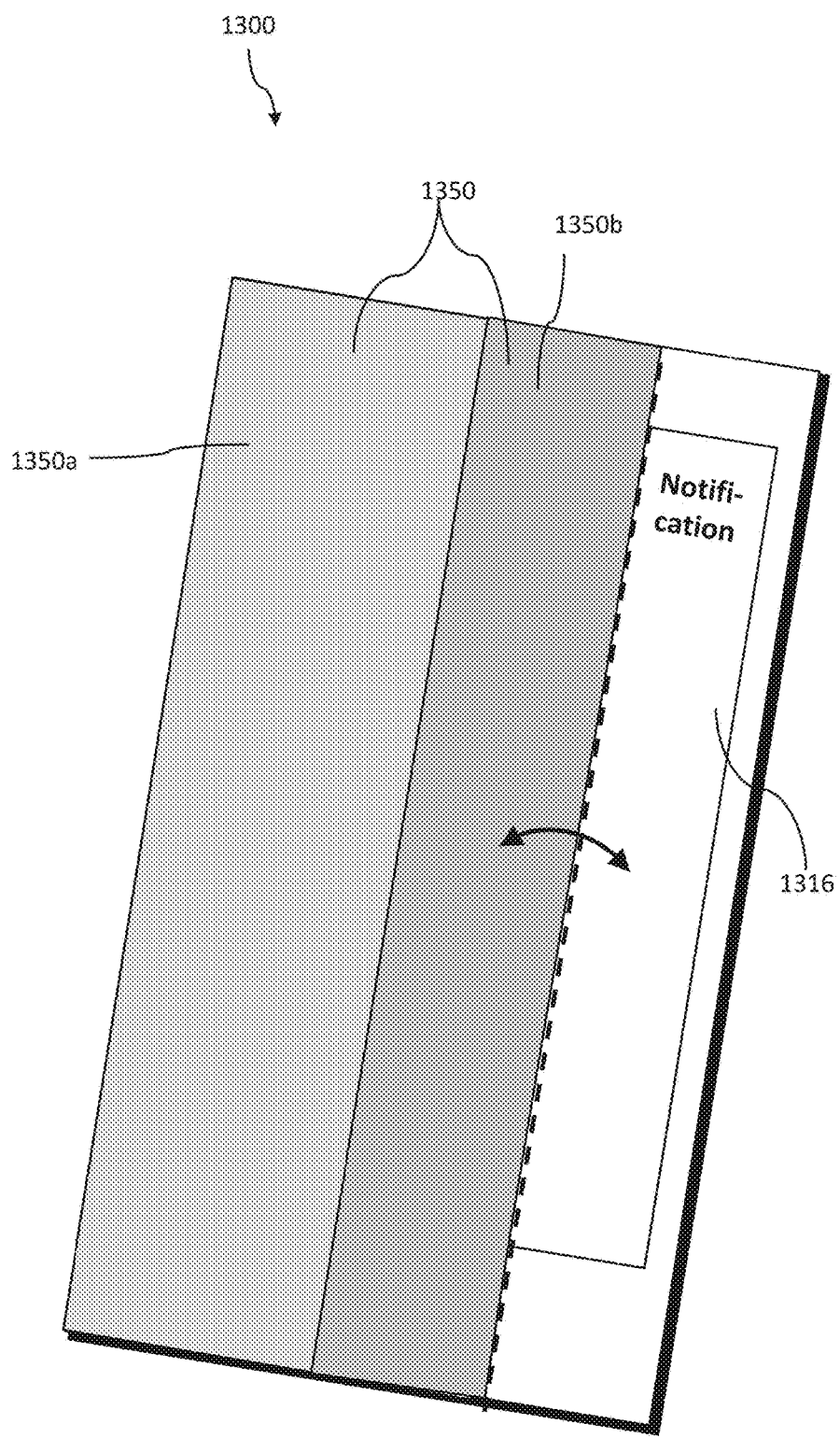
FIG. 13 shows an example computing device providing a visuo-haptic notification by having a notification portion of a surface in a notification position.
Figure 14:
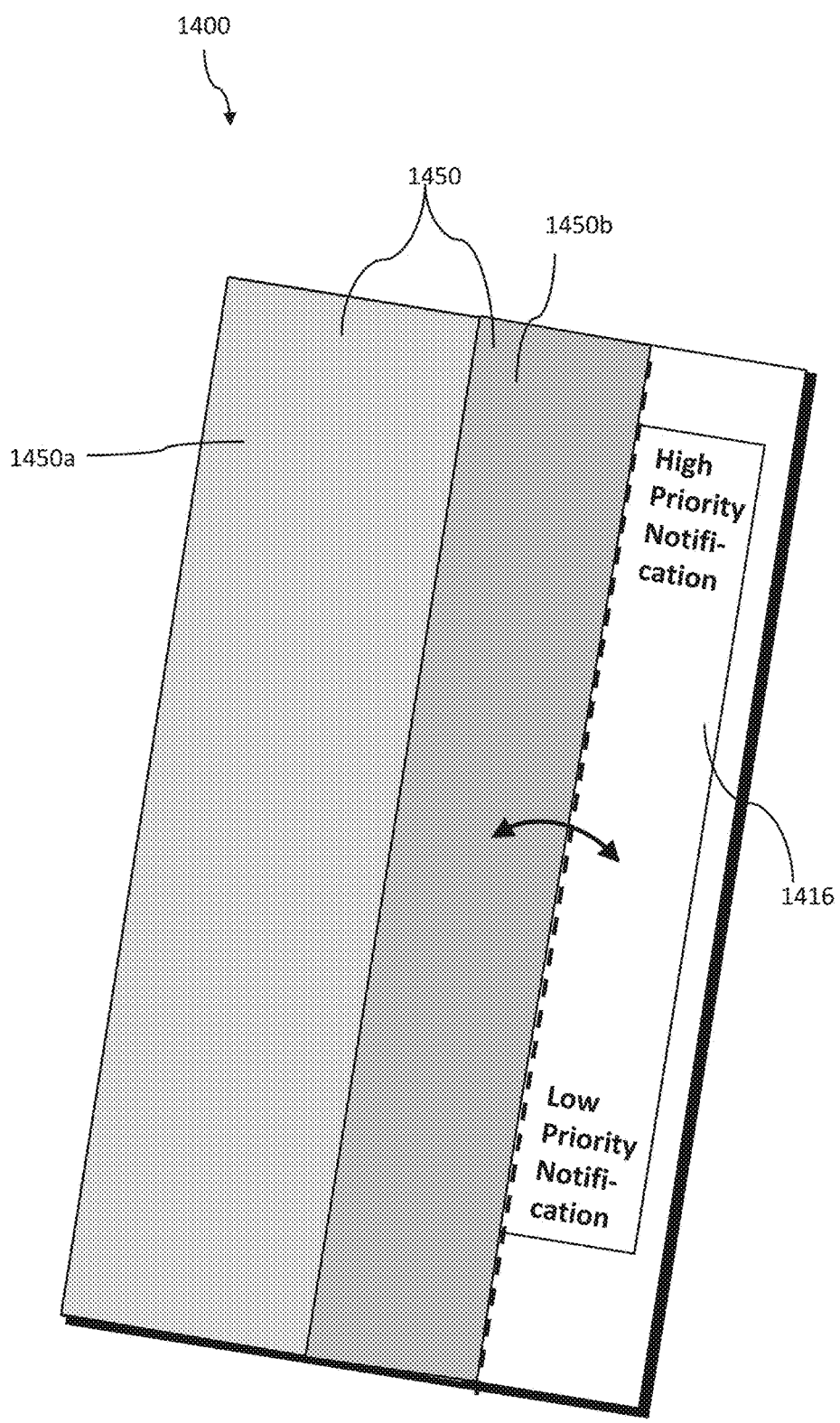
FIG. 14 shows an example computing device providing a visuo-haptic notification by having a notification portion of a surface in a notification position.
Figure 15:
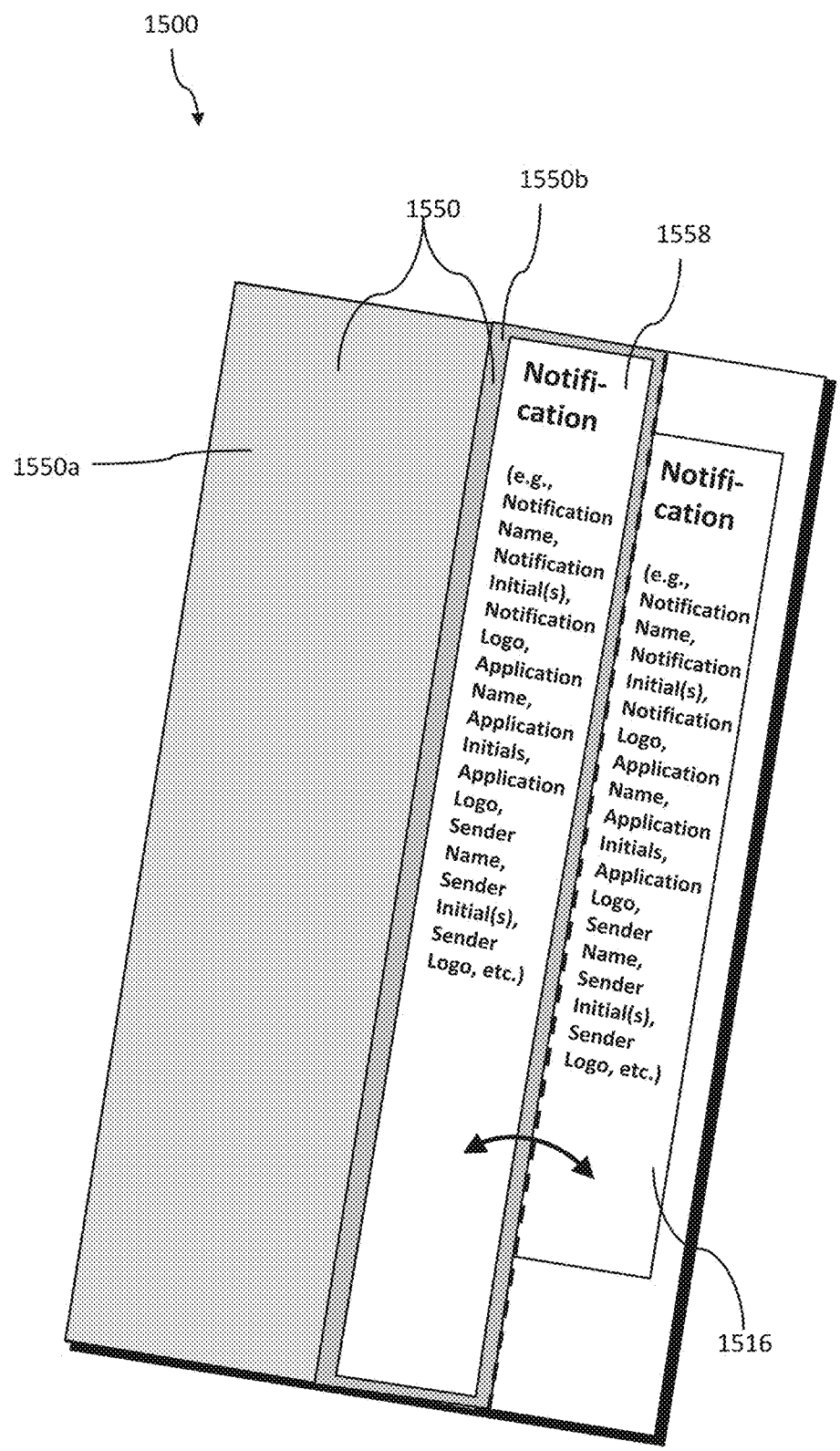
FIG. 15 shows an example computing device providing a visuo-haptic notification by having a notification portion of a surface in a notification position.

In other examples, a display (e.g., 1058 in FIG. 10) is disposed within a notification portion (e.g., 1050*b* in FIG. 10) of a surface (e.g., 1050 in FIG. 10) and the display (e.g., 1058 in FIG. 10) is visible when the notification portion (e.g., 1050*b* in FIG. 10) of the surface (e.g., 1050 in FIG. 10) is in the original position (e.g., FIG. 5) in and in the notification position (e.g., FIG. 10). As discussed above, and as further shown in FIG. 10, at least part of the notification can be displayed on a display (e.g., 1058 in FIG. 10) disposed within a notification portion (e.g., 1050*b* in FIG. 10) of a surface (e.g., 1050 in FIG. 10) that changes from an original position to a notification position when the notification portion (e.g., 1050*b* in FIG. 10) of the surface (e.g., 1050 in FIG. 10) is in the notification position.

In some examples, processor 202 in computing device 200 generates a signal configured to cause touch-sensitive surface 216, which in these examples is a touch-sensitive display, to display text and/or graphic(s) to provide at least part of the notification and outputs the signal to the touch-sensitive display. In these examples, the text and/or graphic(s) is displayed on the touch-sensitive display. In these example, the touch-sensitive display is covered by the surface 256 when the surface 256 is in an original position. Moreover, in these examples, a portion of the touch-sensitive display is visible when a notification portion 256*b* of the surface 256 is in the notification position. Thus, the portion of the touch-sensitive display is visible when the notification portion 256*b* of the surface 256 is in the notification position and is not visible when the notification portion 256*b* of the surface 256 is in the original position. In examples, at least part of the notification is displayed on the portion of the touch-sensitive display when the notification portion 256*b* of the surface 256 is in the notification position. For example, as shown in FIGS. 1A and 1B, display 116 is not visible when cover 150 (collectively, flexible surface 150*a* and surface 150*b*) is in an original position (as shown in FIG. 1A) and a portion of display 116 is visible when flexible surface 150*b* of cover 150 is in a notification position (as shown in FIG. 1B).

As other example, a display (not shown) is not visible when a notification portion (e.g., 550*b*, 650*b*, 750*b*, 750*c*, 850*b* in FIGS. 5, 6, 7, and 8, respectively) of the surface (e.g., 550, 650, 750, and 850 in FIGS. 5, 6, 7, and 8, respectively) is in an original position (as shown in FIGS. 5, 6, 7, and 8). In these examples, the display (not shown) is covered by the surface (e.g., 550, 650, 750, and 850 in FIGS. 5, 6, 7, and 8, respectively) when the surface is in an original position (as shown in FIGS. 5, 6, 7, and 8). In some examples, a portion of a display (e.g., 916, 1016, 1116, 1216, 1316, 1416, and 1516 in FIGS. 9, 10, 11, 12, 13, 14, and 15, respectively) in a computing device (e.g., 900, 1000, 1100, 1200, 1300, 1400, and 1500 in FIGS. 9, 10, 11, 12, 13, 14, and 15, respectively) is visible when the notification portion (e.g., 950*b*, 1050*b*, 1150*b*, 1250*b*, 1350*b*, 1450*b*, and 1550*b* in FIGS. 9, 10, 11, 12, 13, 14, and 15, respectively) of the surface (e.g., 950, 1050, 1150, 1250, 1350, 1450, and 1550 in FIGS. 9, 10, 11, 12, 13, 14, and 15, respectively) is in the notification position (as shown in FIGS. 9, 10, 11, 12, 13, 14, and 15). In these examples, at least part of the notification can be displayed on the portion of the display (e.g., FIGS. 10, 11, 12, 13, 14, and 15).

In examples, the at least part of the notification may be a name corresponding to a type of the notification, an abbreviation corresponding to a type of the notification, a logo or other graphic corresponding to a type of the notification, a name corresponding to an application requesting the notification, an abbreviation corresponding to a name of an application requesting the notification, a logo or other graphic corresponding to a name of an application requesting the notification, a name of a sender of a message corresponding to the notification, an abbreviation of a name of a sender of a message corresponding to the notification, initials of a name of a sender of a message corresponding to the notification, a logo or other graphic corresponding to a sender of a message corresponding to the notification, at least part of a message corresponding to the notification, etc.

At block 440, a determination is made as to whether an acknowledgment of the visuo-haptic notification has been received. For example, in one embodiment, processor 202 in computing device 200 determines whether an acknowledgment of the visuo-haptic notification has been received. As another example, in one embodiment, processor 302 in computing device 300 determines whether an acknowledgment of the visuo-haptic notification has been received. In embodiments, if processor 302 has not determined that an acknowledgment of the visuo-haptic notification has been received, then the processor 302 determines that an acknowledgment of the visuo-haptic notification has not been received.

Figure 5:
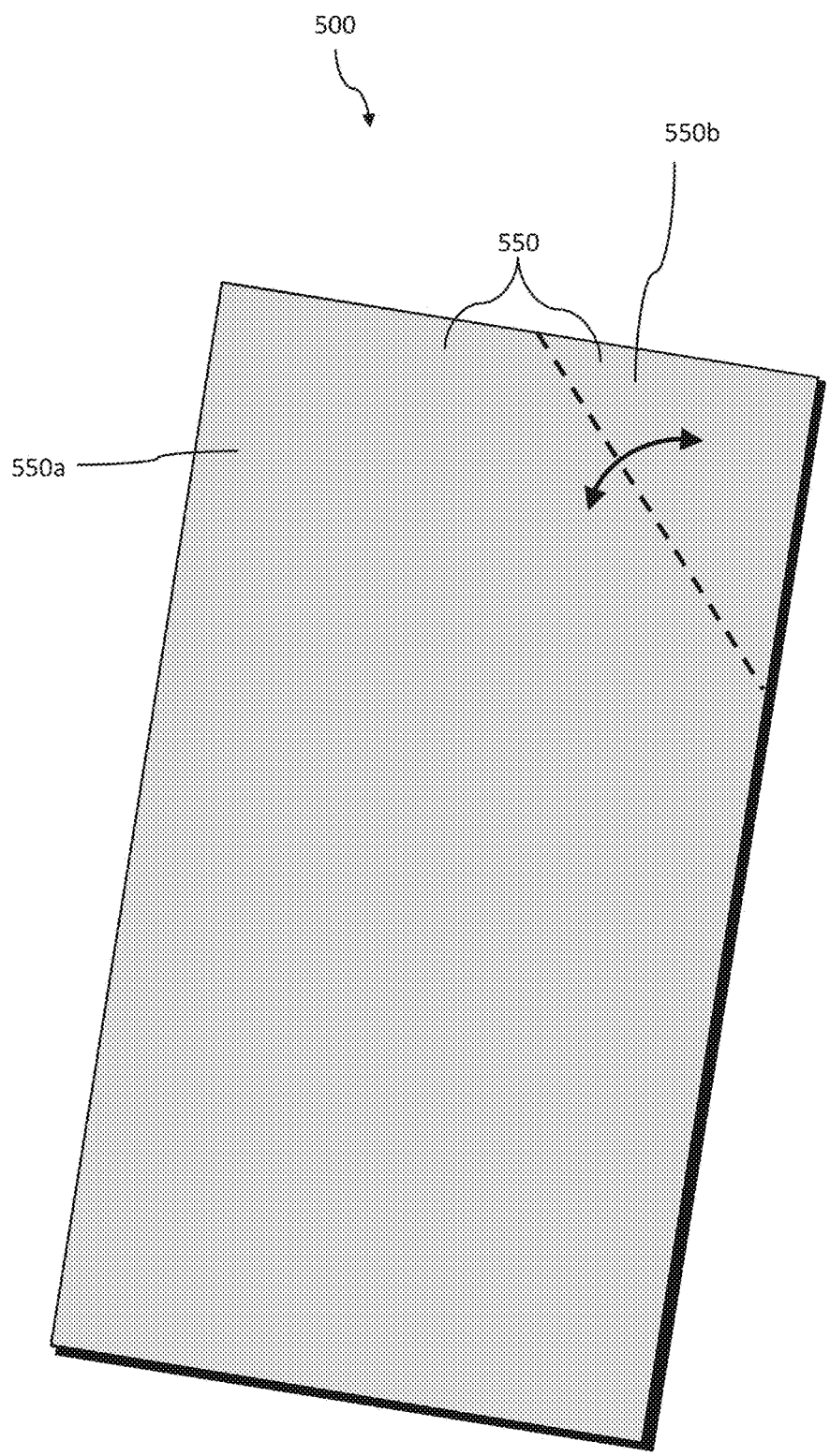
FIG. 5 shows an example computing device for providing visuo-haptic notifications with a surface in an original position.
Figure 6:
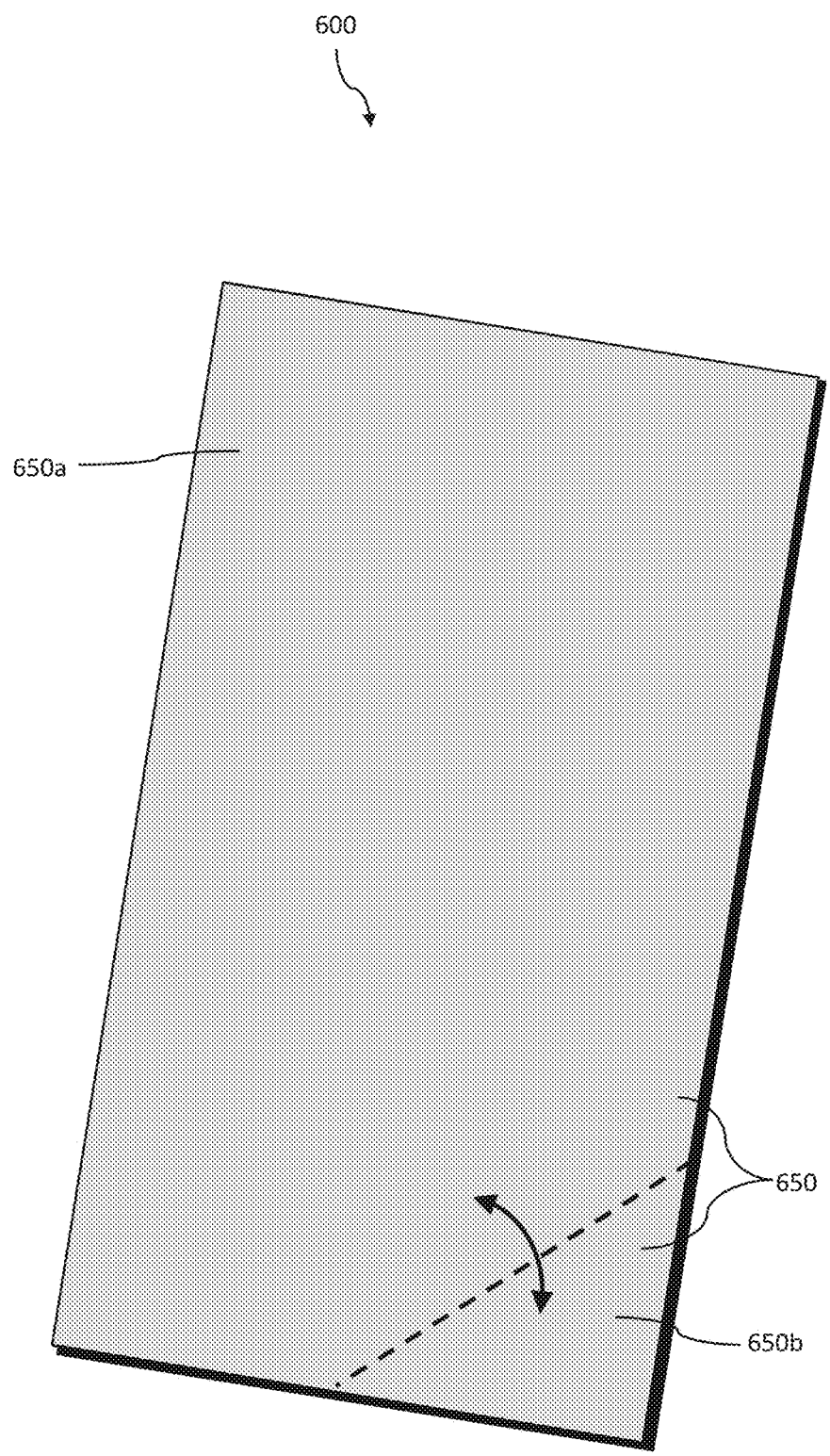
FIG. 6 shows an example computing device for providing visuo-haptic notifications with a surface in an original position.
Figure 7:
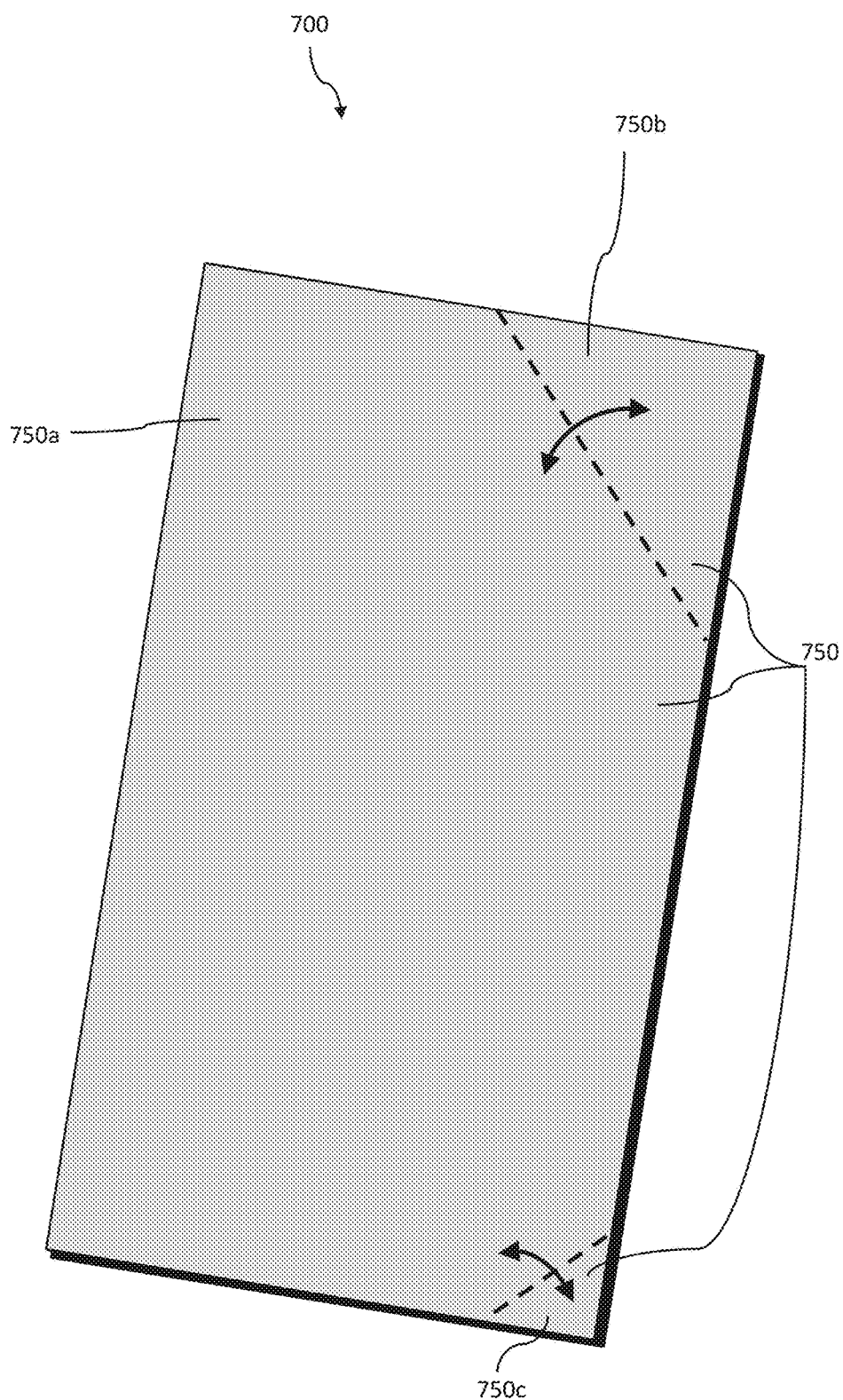
FIG. 7 shows an example computing device for providing visuo-haptic notifications with a surface in an original position.
Figure 8:
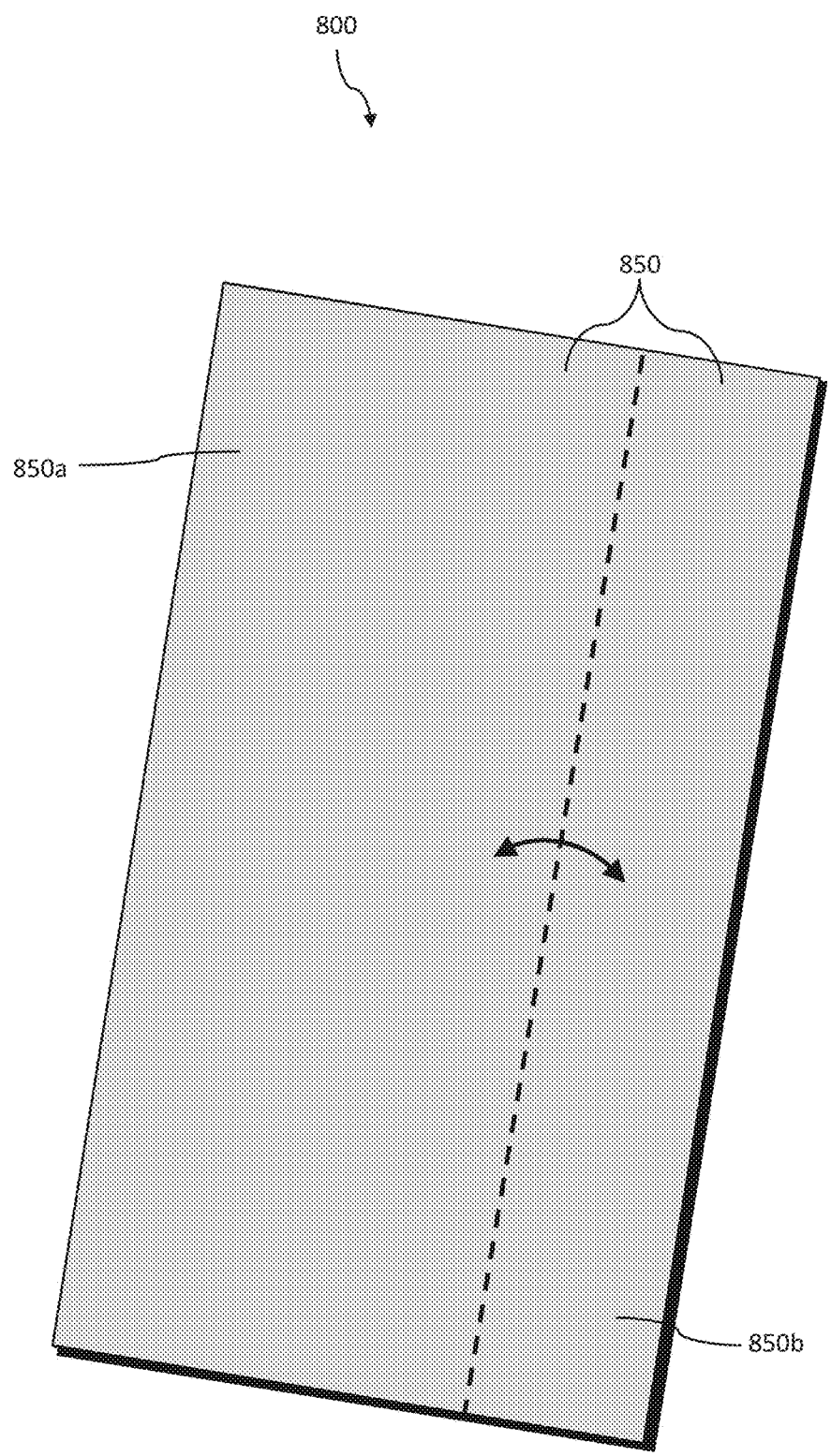
FIG. 8 shows an example computing device for providing visuo-haptic notifications with a surface in an original position.
Figure 9:
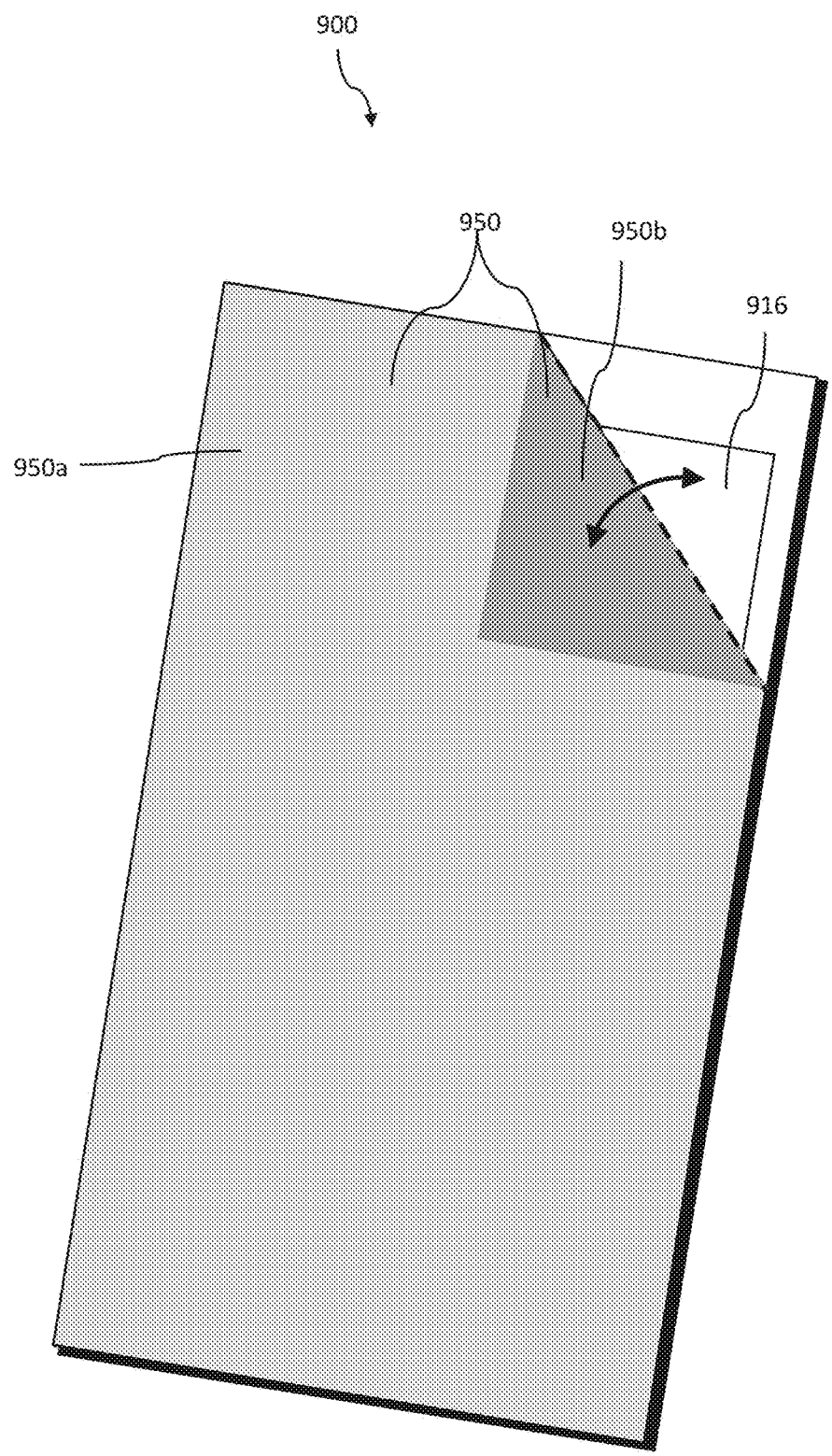
FIG. 9 shows an example computing device providing a visuo-haptic notification by having a notification portion of a surface in a notification position.

In some examples, referring to FIG. 3, accessory 350 receives an acknowledgment that the visuo-haptic notification has been accessed by a user of computing device 300 when the user physically changes a notification portion 256*b* of surface 256 in the accessory 350 from a notification position back to an original position. As another example, an acknowledgment that the visuo-haptic notification has been accessed by a user of a computing device (e.g., 1000 in FIG. 10) is received when the user of the computing device pushes the notification portion (e.g., 1050*b* in FIG. 10) of the surface (1050 in FIG. 10) to change the notification portion (1050*b* in FIG. 10) from a notification position (such as shown in FIG. 10) to an original position (such as shown in FIG. 5). In other embodiments, a computing device determines that an acknowledgment that the visuo-haptic notification has been accessed by a user of the computing device when the user presses a button on the computing device and/or the user presses a button on an accessory of the computing device to indicate that the visuo-haptic notification has been accessed by the user. In embodiments, a computing device determines that an acknowledgment that the visuo-haptic has been accessed by a user of the computing device when the user contacts a touch-sensitive display in the computing device and/or contacts a touch-sensitive display in an accessory for the computing device.

In some examples, a processor in a computing device periodically determines whether an acknowledgment that the visuo-haptic notification has been accessed by a user of the computing device. For example, referring to FIG. 3, processor 302 in computing device 300 can determine whether an acknowledgment that the visuo-haptic notification has been accessed by a user of the computing device 300 has been received within a predetermined time since a notification portion 356*b* of surface 356 has been changed from an original position to a notification position. In some examples, the predetermined time can be between 1 minute and 60 minutes. In examples, the predetermined time can be specified by a user of the computing device for particular types of notifications.

Referring back to FIG. 4, if a determination is made at block 440 that an acknowledgment of the visuo-haptic notification has not been accessed, then the method 400 proceeds to block 450. At block 450, at least one signal is generated and output to repeat the visuo-haptic notification.

For example, at least one signal can be generated and output similar to the discussion herein with respect to block 430. However, in examples, the generated signal(s) are configured to cause a haptic output device to force a notification portion of the surface to return to an original position and then revert back to a notification position, and output to the generated signal(s) to the haptic output device. In embodiments, the generated signal(s) can be configured to cause a haptic output device to repeatedly (e.g., 2 times, 3 times, 4 times, 5 times, etc.) force a notification portion of the surface to return to an original position and then revert back to a notification position to alert a user that a visuo-haptic notification is pending and has not been accessed by a user of the computing device.

In some examples, the generated signal(s) are configured to cause a display embedded within the notification portion of the surface to blink to provide at least part of the notification and/or the generated signal(s) are configured to cause a touch-sensitive display in the computing device that is covered when the surface is in an original position and at least partially visible when the notification portion of the surface is in the notification position to blink to provide at least part of the notification. For example, the generated signals(s) can be output to one or more displays to cause the display(s) to clear and then to redisplay at least part of the notification to alert a user that a visuo-haptic notification is pending and has not been accessed by a user of the computing device.

Referring back to FIG. 4, if a determination is made at block 440 that an acknowledgment of the visuo-haptic notification has been accessed, then the method 400 proceeds to block 460. At block 460, at least one signal is generated and output to remove the visuo-haptic notification.

For example, at least one signal can be generated and output similar to the discussion herein with respect to block 430 and 450. However, in examples, the generated signal(s) are configured to cause a haptic output device to force a notification portion of the surface to return to an original position and output the generated signal(s) to the haptic output device. In some examples, the generated signal(s) are configured to cause a display embedded within the notification portion of the surface to remove any part of the notification displayed on the display from the display and/or the generated signal(s) are configured to cause a touch-sensitive display in the computing device to remove any part of the notification displayed on the touch-sensitive display from the touch-sensitive display.

In one embodiment, a notification portion of a surface primarily stays in an original position in providing a notification even if an acknowledgment has not yet been received. For example, a notification may be provided by changing the notification portion of the surface from an original position to a notification position for a short time (e.g., 1 second, 2 seconds, 5 seconds, 10 seconds, 30 seconds, etc.) and then changing the notification portion of the surface from the notification position back to the original position. In this example, if an acknowledgement that the notification has been accessed by a user is not received within a predetermined time since the notification portion of the surface has been changed back to the original position, then the notification portion of the surface can change from the original position back to the notification position and can optionally return back to the original position to indicate that the notification has not been acknowledged. In some examples, the predetermined time can be between 1 minute and 60 minutes. In examples, the predetermined time can be specified by a user of the computing device for particular types of notifications.

While some examples of devices, systems, and methods herein are described in terms of software executing on various machines, the methods and systems may also be implemented as specifically-configured hardware, such as field-programmable gate array (FPGA) specifically to execute the various methods. For example, examples can be implemented in digital electronic circuitry, or in computer hardware, firmware, software, or in a combination thereof. In one example, a device may include a processor or processors. The processor comprises a computer-readable medium, such as a random access memory (RAM) coupled to the processor. The processor executes computer-executable program instructions stored in memory, such as executing one or more computer programs for editing an image. Such processors may comprise a microprocessor, a digital signal processor (DSP), an application-specific integrated circuit (ASIC), field programmable gate arrays (FPGAs), and state machines. Such processors may further comprise programmable computing devices such as PLCs, programmable interrupt controllers (PICs), programmable logic devices (PLDs), programmable read-only memories (PROMs), electronically programmable read-only memories (EPROMs or EEPROMs), or other similar devices.

Such processors may comprise, or may be in communication with, media, for example computer-readable storage media, that may store instructions that, when executed by the processor, can cause the processor to perform the steps described herein as carried out, or assisted, by a processor. Examples of computer-readable media may include, but are not limited to, an electronic, optical, magnetic, or other storage device capable of providing a processor, such as the processor in a web server, with computer-readable instructions. Other examples of media comprise, but are not limited to, a floppy disk, CD-ROM, magnetic disk, memory chip, ROM, RAM, ASIC, configured processor, all optical media, all magnetic tape or other magnetic media, or any other medium from which a computer processor can read. The processor, and the processing, described may be in one or more structures, and may be dispersed through one or more structures. The processor may comprise code for carrying out one or more of the methods (or parts of methods) described herein.

The foregoing description of some examples has been presented only for the purpose of illustration and description and is not intended to be exhaustive or to limit the disclosure to the precise forms disclosed. Numerous modifications and adaptations thereof will be apparent to those skilled in the art without departing from the spirit and scope of the disclosure.

Reference herein to an example or implementation means that a particular feature, structure, operation, or other characteristic described in connection with the example may be included in at least one implementation of the disclosure. The disclosure is not restricted to the particular examples or implementations described as such. The appearance of the phrases "in one example," "in an example," "in one implementation," or "in an implementation," or variations of the same in various places in the specification does not necessarily refer to the same example or implementation. Any particular feature, structure, operation, or other characteristic described in this specification in relation to one example or implementation may be combined with other features, structures, operations, or other characteristics described in respect of any other example or implementation.

That which is claimed is:

1. A method comprising:
   determining, by a computing device, that a notification should be provided;
   determining, by the computing device, to use visuo-haptics to provide the notification;
   generating, by the computing device, a signal configured to cause a haptic output device to change a position of a notification portion of a surface from an original position to a notification position, wherein the change in position of the notification portion of the surface to the notification position provides at least part of the notification; and
   outputting, by the computing device, the signal to the haptic output device, wherein the notification portion of the surface maintains the notification position after the signal is output.

2. The method of claim 1, wherein the computing device comprises the surface and the haptic output device.

3. The method of claim 1, wherein the surface and the haptic output device are part of an accessory for the computing device.

4. The method of claim 3, wherein the accessory is a cover for the computing device.

5. The method of claim 3, further comprising:
   in response to the accessory receiving an acknowledgment that the notification has been accessed by a user of the computing device:
      generating, by the computing device, a second signal configured to cause the haptic output device to change the position of the notification portion of the surface from the notification position back to the original position; and
      outputting the second signal to the haptic output device.

6. The method of claim 1, further comprising:
   in response to determining that an acknowledgment that the notification has been accessed by a user of the computing device has not been accessed within a predetermined time:
      generating, by the computing device, a plurality of signals configured to cause the haptic output device to change the position of the notification portion of the surface from the notification position to the original position and then revert back to the notification position; and
      outputting, by the computing device, the plurality of signals to the haptic output device.

7. The method of claim 6, wherein the predetermined time is between 1 minute and 60 minutes.

8. The method of claim 1, wherein the computing device is at least one of a smartphone, a phablet, or a tablet.

9. The method of claim 1, further comprising:
   in response to the computing device receiving an acknowledgment that the notification has been accessed by a user of the computing device:
      generating, by the computing device, a second signal configured to cause the haptic output device to change the position of the notification portion of the surface from the notification position back to the original position; and
      outputting, by the computing device, the second signal to the haptic output device.

10. The method of claim 1, wherein a portion of a display in the computing device is visible when the notification portion of the surface is in the notification position and that is not visible when the notification portion of the surface is in the original position, and wherein at least part of the notification is displayed on the portion of the display.

11. The method of claim 1,
    wherein a display disposed within the notification portion of the surface is visible when the notification portion of the surface is in the notification position and is not visible when the notification portion of the surface is in the original position, and
    wherein at least part of the notification is displayed on the display.

12. The method of claim 11, wherein the display comprises a bi-stable display.

13. The method of claim 11,
    wherein the computing device determines that the notification should be provided based at least in part on receiving an indication from an application being executed on the computing device that the notification should be provided, and
    wherein the notification displayed on the display comprises at least one letter corresponding to a name of the application or a graphic corresponding to the name of the application.

14. The method of claim 11, wherein the computing device determines that the notification should be provided based at least in part on receiving a message from a user of a second computing device, and wherein the message comprises at least one of a text message, an email, a tweet, or a chat.

15. The method of claim 14, wherein at least part of the message is displayed on a portion of a second display in the computing device that is visible when the notification portion of the surface is in the notification position.

16. A non-transitory computer-readable medium comprising one or more software applications configured to be executed by a processor, the one or more software applications configured to:
    determine that a notification should be provided;
    determine to use visuo-haptics to provide the notification;
    generate a signal configured to cause a haptic output device to change a position of a notification portion of a surface from an original position to a notification position, wherein the change in position of the notification portion of the surface to the notification position provides at least part of the notification; and
    output the signal to the haptic output device, wherein the notification portion of the surface maintains the notification position after the signal is output.

17. The non-transitory computer-readable medium of claim 16, wherein the one or more software applications is further configured to:
    in response to receiving an acknowledgment that the notification has been accessed by a user of a computing device comprising the processor:
       generate a second signal configured to cause the haptic output device to change the position of the notification portion of the surface from the notification position back to the original position; and
       output the second signal to the haptic output device.

18. The non-transitory computer-readable medium of claim 16, wherein the one or more software applications is further configured to:

in response to determining that an acknowledgment that the notification has been accessed by a user of a computing device comprising the processor has not been accessed within a predetermined time:
  generating a plurality of signals configured to cause the haptic output device to change the position of the notification portion of the surface from the notification position to the original position and then revert back to the notification position; and
  output the plurality of signals to the haptic output device.

19. The non-transitory computer-readable medium of claim 16, wherein the one or more software applications is further configured to:
  display at least part of the notification on a display in the notification portion of the surface that is visible when the notification portion of the surface is in the notification position and that is not visible when the notification portion of the surface is in the original position.

20. The non-transitory computer-readable medium of claim 16, wherein the one or more software applications is further configured to:
  display at least part of the notification on a portion of a display in a computing device that is visible when the notification portion of the surface is in the notification position and that is not visible when the notification portion of the surface is in the original position.

21. An accessory for a portable computing device, the accessory comprising:
  a surface comprising a notification portion; and
  a haptic output device positioned on the notification portion of the surface and configured to cause a position of the notification portion of the surface to change between an original position and a notification position in response to receiving a notification signal from the portable computing device.

22. The accessory of claim 21,
  wherein the haptic output device is configured to maintain the notification portion of the surface in the notification position after receiving the notification signal until receiving a repeat notification signal or an acknowledgment signal, and
  wherein the haptic output device is further configured to cause the position of the notification portion of the surface to change from the notification position to the original position in response to receiving the acknowledgment signal.

23. The accessory of claim 22, wherein the haptic output device is further configured to cause the position of the notification portion of the surface to change from the notification position to the original position and then revert back to the notification position in response to receiving the repeat notification signal, the repeat notification signal indicating that an acknowledgment by a user of the portable computing device has not been received.

24. The accessory of claim 21, further comprising a bi-stable display disposed within the notification portion of the surface such that the bi-stable display is visible when the notification portion of the surface is in the notification position and is not visible when the notification portion of the surface is in the original position, and
  wherein the bi-stable display is configured to display a notification message in response to receiving the notification signal from the portable computing device.

25. The accessory of claim 21, wherein the accessory is a cover for the portable computing device.

26. The accessory of claim 21, wherein the haptic output device comprises at least one multi-stable actuator.

* * * * *